(12) United States Patent
Tankhilevich

(10) Patent No.: US 11,162,894 B2
(45) Date of Patent: *Nov. 2, 2021

(54) COHERENT TERAHERTZ MAGNON LASER AND COHERENT TERAHERTZ COMMUNICATION SYSTEM

(71) Applicant: Magtera, Inc., Walnut Creek, CA (US)

(72) Inventor: Boris G. Tankhilevich, Walnut Creek, CA (US)

(73) Assignee: Magtera, Inc., Walnut Creek, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/655,472

(22) Filed: Oct. 17, 2019

(65) Prior Publication Data

US 2020/0225152 A1 Jul. 16, 2020

Related U.S. Application Data

(63) Continuation-in-part of application No. 16/245,224, filed on Jan. 10, 2019, now Pat. No. 10,892,602.

(Continued)

(51) Int. Cl.
  *H01S 1/02* (2006.01)
  *H01F 10/32* (2006.01)
  (Continued)

(52) U.S. Cl.
  CPC ......... *G01N 21/3581* (2013.01); *B82Y 25/00* (2013.01); *H01F 10/3254* (2013.01); *H01S 1/02* (2013.01); *G02F 2203/13* (2013.01)

(58) Field of Classification Search
  CPC .. H01S 5/04252; H01S 5/0208; H01S 5/0213; H01S 5/3402; H01S 5/0218;
  (Continued)

(56) References Cited

U.S. PATENT DOCUMENTS 7,430,074 B2  9/2008  Korenblit et al.
7,508,578 B2  3/2009  Korenblit et al.
(Continued)

OTHER PUBLICATIONS

Vilkov et al., "Generation of Terahertz Radiation Spectra by Radiation Sources Based on Solid-Slate Micro- and Nanostructures and Detection of Terahertz Spectra", DOI: 10.1134/S106422691809022X, Sep. 28, 2018, pp. 1015-1026.*

(Continued)

*Primary Examiner* — Tuan N Nguyen
(74) *Attorney, Agent, or Firm* — Amin, Turocy & Watson, LLP

(57) ABSTRACT

An apparatus for generation of coherent terahertz radiation is provided. In one example, the apparatus includes one or more multilayer tunable microcolumns. In turn, a multilayer tunable microcolumn can include a substrate, a bottom electrode, a bottom layer of a ferromagnetic material further comprising a magnon gain medium (MGM) coupled to the bottom electrode, a tunnel junction coupled to the ferromagnetic material, a spin injector coupled to the tunnel junction, a pinning layer coupled to the spin injector, a reference layer coupled to the pinning layer and a top electrode. In one example, a containment cavity encloses at least one of the multilayer tunable microcolumns. In one example, a storage cavity encloses the containment cavity.

27 Claims, 14 Drawing Sheets

Front View
Plurality of Multi-layer Columns

Related U.S. Application Data

(60) Provisional application No. 62/822,284, filed on Mar. 22, 2019.

(51) Int. Cl.
*B82Y 25/00* (2011.01)
*G01N 21/3581* (2014.01)

(58) Field of Classification Search
CPC ... H01S 5/0622; H01F 41/32; H03K 19/0944; B82Y 25/00; G02F 2203/15
USPC .............................. 372/4; 359/342; 326/49
See application file for complete search history.

(56) References Cited

U.S. PATENT DOCUMENTS

| | | | |
|---|---|---|---|
| 7,982,946 B1 | 7/2011 | Korenblit et al. | |
| 8,031,397 B1 | 10/2011 | Korenblit et al. | |
| 9,132,451 B1 | 9/2015 | Tankhilevich | |
| 9,136,665 B1 | 9/2015 | Tankhilevich et al. | |
| 9,418,648 B1* | 8/2016 | Tankhilevich | G10K 11/18 |
| 2006/0118839 A1 | 6/2006 | Sugahara et al. | |
| 2012/0091548 A1* | 4/2012 | Sukegawa | B82Y 40/00 257/421 |
| 2012/0112299 A1 | 5/2012 | Inomata et al. | |

OTHER PUBLICATIONS

Notice of Allowance received for U.S. Appl. No. 16/245,224 dated Apr. 14, 2020, 27 pages.
Notice of Allowance received for U.S. Appl. No. 16/704,090 dated May 26, 2020, 35 pages.
Notice of Allowance received for U.S. Appl. No. 16/245,247 dated May 27, 2020, 29 pages.
International Preliminary Report on Patentability received for PCT Application Serial No. PCT/US2020/012985 dated Apr. 2, 2020, 18 pages.
Vilkov et al., "Generation of Terahertz Radiation Spectra by Radiation Sources Based on Solid-State Micro- and Nanostructures and Detection of Terahertz Spectra", DOI: 10.1134/S106422691809022X, Sep. 28, 2018, pp. 1015-1026.
Sulymenko et al., "Terahertz-Frequency Signal Source Based on an Antiferromagnetic Tunnel Junction ", DOI 10.1109/LMAG.2018 2852291, Jul. 2, 2018, 5 pages.
Gulyaev et al., "Generation of Terahertz Radiation in Magnetic Junctions based on Nanowires." DOI: 10.1134/S1063785019030271, May 6, 2019, pp. 271-273.
International Preliminary Report on Patentability received for PCT Application Serial No. PCT/US2020/012229 dated Apr. 7, 2020, 19 pages.
International Preliminary Report on Patentability received for PCT Application Serial No. PCT/US2020/012982 dated Apr. 20, 2020, 17 pages.

* cited by examiner

Cross Sectional View
Terahertz Magnon Laser with RKKY Pinning Layer

Electron spectrum and generation of magnons in half-metals. The Fermi level $E_f$ lies inside the exchange gap, $\Delta$ of the minority electrons. The generation of magnons is similar to the process in ferromagnetic semiconductors. $\delta E$ is the energy the electron transmits to the Fermi electrons immediately after emitting a magnon.

Front View
Plurality of Multi-layer Columns Including THz Transparent Medium

Top View
THz Generator Chip Including Plurality of Multi-layer Columns with THz Transparent Medium

COHERENT TERAHERTZ MAGNON LASER AND COHERENT TERAHERTZ COMMUNICATION SYSTEM

CROSS REFERENCE TO RELATED APPLICATIONS

This application claims priority to U.S. Provisional Patent Application No. 62/822,284, filed Mar. 22, 2019, and entitled "COHERENT TERAHERTZ MAGNON LASER AND COHERENT TERAHERTZ COMMUNICATION SYSTEM." This application is also a continuation-in-part of, and claims priority to, U.S. patent application Ser. No. 16/245,224 titled "TUNABLE MULTILAYER TERAHERTZ MAGNON GENERATOR" and filed on Jan. 10, 2019. This application is also a continuation-in-part of, and claims priority to, U.S. patent application Ser. No. 16/245,247 titled "TERAHERTZ MAGNON GENERATOR COMPRISING PLURALITY OF SINGLE TERAHERTZ MAGNON LASERS" and filed on Jan. 10, 2019. The entireties of the foregoing applications listed herein are hereby incorporated by reference.

TECHNICAL FIELD

The current invention relates to the field of magnon lasers employed to generate terahertz radiation.

BACKGROUND ART

Terahertz (THz) radiation, an electromagnetic radiation in a frequency interval from 0.1 THz to 30 THz, occupies the portion of the electromagnetic spectrum between the microwave band and the infrared band.

A THz photon has an energy that is less than the energy of an optical photon. That is why THz-waves can penetrate deep into substances where optical waves cannot penetrate. At THz frequencies, molecules vibrate. That is why THz waves are useful in the study of molecules.

Indeed, the unique rotational and vibrational responses of molecules within the THz range provide information that is generally absent in optical, X-ray and NMR images. A THz wave can easily penetrate and inspect the insides of most dielectric materials, which are opaque to visible light and low contrast to X-rays, making THz waves a useful complementary imaging source.

For example, THz waves maintain reasonable penetration depth in certain common materials, such as clothes, plastic, wood, sand and soil. Therefore, THz technology has the potential to detect explosives packaged or buried within these materials because the explosives have unique THz spectral properties when compared to the surrounding materials. The spectral fingerprints of explosive materials can be expected in the THz band, and THz imaging can be applied for landmine detection. However, at present, efficient, compact, solid-state sources for the spectral range 0.1-30 THz are still lacking.

Indeed, broadband pulsed THz sources are usually based on the excitation of different materials with ultra-short laser pulses. Several different mechanisms have been exploited to generate THz radiation, including photo carrier acceleration in photo conducting antennas, second-order non-linear effects in electro-optic crystals etc.

For narrowband THz sources, solid-state lasers are often considered. They are based on inter-band transitions in narrow gap semiconductors or on inter sub band transitions, i.e. transitions in quantum confined structures, e.g. nanostructures, between confined conduction or valence states. To get THz radiation from direct inter band transitions, near zero gap semiconductors are required. For inter sub band transitions conventional wide gap materials can be used, but require precise complicated structures. At present the construction of multiple quantum-well semiconductor structures for laser emission is feasible.

The quantum cascade consists of a repeating structure, in which each repeating unit is made up of an injector and an active region. In the active region, a population inversion exists and electron transition to a lower energy level occurs, emitting photons at a specific wavelength. Kohler et al. (R. Kohler et al., Nature 417, 156 (2002)) designed a THz quantum cascade laser operating at 4.4 THz. The laser consisted of a total over 700 quantum wells, and demonstrated pulse operation at temperature of 10 K. For a review, please see, e.g., B Ferguson and X.-C. Zhang, Nat. Matter, 26 (2002).

The latest progress in QCL generators was reported by Manijeh Razeghi, et al. in Photonics Spectra, December, 48-51 (2016). The authors used nonlinear mixing of two QCL. However, the usage of nonlinear mixers invites the inherent limitations. Indeed, the nonlinear QCL mixers are very complicated devices (each such QCL comprising multiple barrier layers and multiple well layers that should be fabricated with the accuracy up to 0.1 nm), have low output power in continuous regime (these devices reach the power output up to 0.5 milliwatt only in pulsed regime); and have very limited tunability in the region of between (2-4.45) THz.

AdTech Optics located in the City of Industry, CA, has been developing and producing innovative QC lasers since 2005. AdTech's QCLs are designed to cover most of the mid-infrared spectral range, from $\lambda=3.8$ μm (78 THz) to $\lambda=12.5$ μm (23.9 THz). Almost all of AdTech's QCLs operate continuously at room temperature and can be designed to work at a single frequency by use of distributed-feedback waveguide fabrication. However, AdTech's QCLs are only mechanically tunable which makes those QCL unpractical for the majority of applications including the spectrometric, communication, etc., to name just a few applications.

A Coherent Terahertz Magnon Laser can enable generation of coherent radiation in terahertz spectrum.

A coherent communication system in terahertz spectrum can be used for many unique applications including but not limited to transmitting, receiving and reading received THz hologram images.

Such THz hologram images can be used to encode clandestine messages including security codes unreadable by any other means except by using another Terahertz Magnon Laser capable of illuminating such holographical images at the receiving end at the same THz frequency as it was recorded at the transmitting end of such coherent terahertz communication system.

SUMMARY

An apparatus for generation of coherent terahertz radiation is provided. In one example, the apparatus includes one or more multilayer tunable microcolumns. In turn, a multilayer tunable microcolumn can include a substrate, a bottom electrode, a bottom layer of a ferromagnetic material further comprising a magnon gain medium (MGM) coupled to the bottom electrode, a tunnel junction coupled to the ferromagnetic material, a spin injector coupled to the tunnel junction, a pinning layer coupled to the spin injector, a reference layer coupled to the pinning layer and a top electrode. In one example, a containment cavity encloses at least one of the multilayer tunable microcolumns. In one example, a storage cavity encloses the containment cavity. This Summary is provided to introduce a selection of concepts that are further described below in the Detailed Description. This Summary is not intended to identify key or essential features of the claimed subject matter, nor is it intended to be used as an aid in determining the scope of the claimed subject matter.

DESCRIPTION OF THE DRAWINGS

The accompanying drawings, which are incorporated in and form a part of this specification, illustrate embodiments of the technology and, together with the description, explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
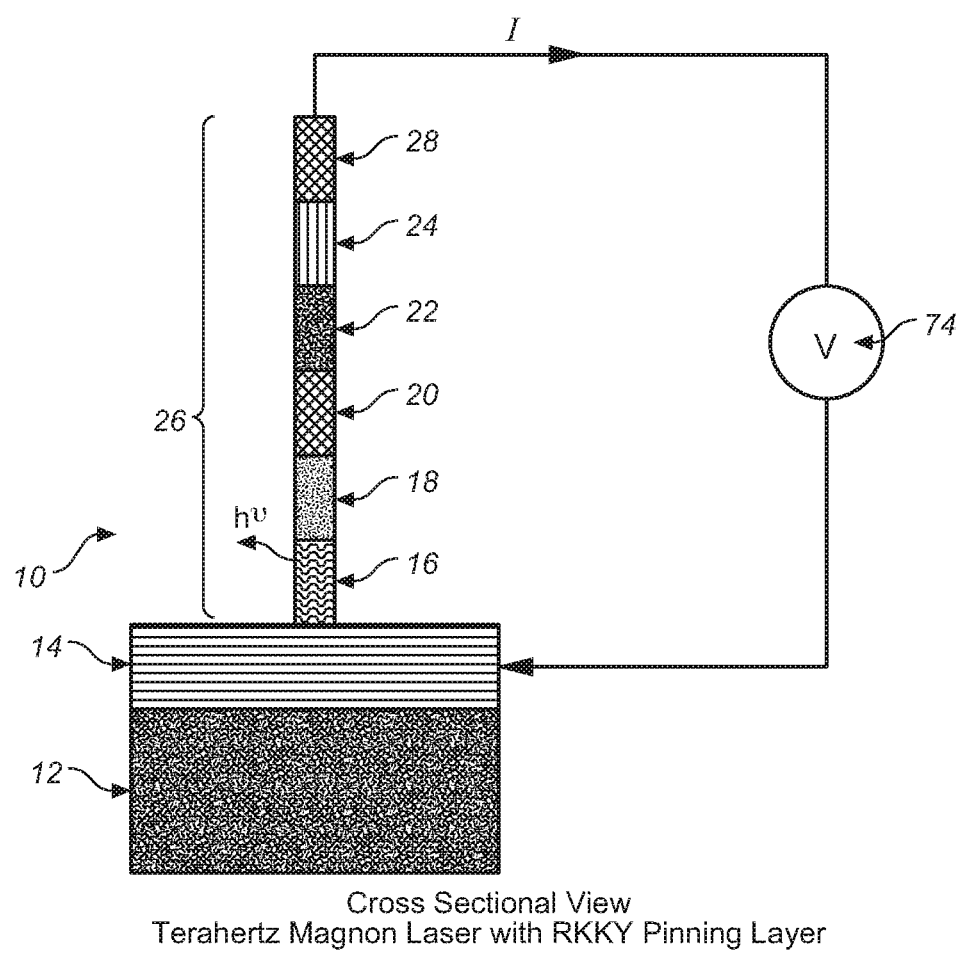
FIG. 1 depicts a cross-sectional view of a tunable multilayer terahertz magnon laser with RUDERMAN-KITTEL-KASUYA-YOSIDA (RKKY) pinning layer comprising a substrate, a bottom electrode, bottom layer, a tunnel junction, a spin injector, a pinning layer, a reference layer and a top electrode for the purposes of the present technology.

In an embodiment of the present technology, FIG. 1 depicts a cross-sectional view of a tunable multilayer terahertz magnon laser 10. The tunable multilayer terahertz magnon laser 10 comprises a substrate 12, a bottom electrode 14, bottom layer 16, a tunnel junction 18, a spin injector 20, a pinning layer 22, a reference layer 24 and a top electrode 28 for the purposes of the present technology. In an embodiment, the pinning layer 22 can further comprise a RUDERMAN-KITTEL-KASUYA-YOSIDA (RKKY) pinning layer. A single multilayer column 26 comprises the bottom layer 16, the tunnel junction 18, the spin injector 20, the pinning layer 22, the reference layer 24 and the top electrode 28. In an embodiment, the spin injector 20 can be, for example, a top layer. In another embodiment, the bottom electrode 14 can be a ground electrode.

In an embodiment of the present technology, the substrate 12 (of FIG. 1) comprises gallium arsenide (GaAs).

Gallium arsenide (GaAs) is a compound of the elements gallium and arsenic. It is a III-V direct bandgap semiconductor with a zinc blende crystal structure. Gallium arsenide is used in the manufacture of monolithic microwave integrated circuits.

GaAs is often used as a substrate material for the epitaxial growth of other III-V semiconductors including: Indium gallium arsenide, aluminum gallium arsenide and others.

GaAs can be fabricated by using molecular beam epitaxy (MBE).

MBE can take place, for example, in a high vacuum or an ultra-high vacuum ($10^{-8}$-$10^{-12}$) Torr.

In an aspect, a deposition rate (typically less than 3,000 nm per hour) of MBE can allow the films to grow epitaxially. These deposition rates generally require proportionally better vacuum to achieve the same impurity levels as other deposition techniques. The absence of carrier gases as well as the ultra-high vacuum environment can result in the highest achievable purity of the grown films.

In solid source MBE, elements such as gallium and arsenic, in ultra-pure form, are heated in separate quasi-Knudsen effusion cells or electron beam evaporators until they begin to slowly sublime. The gaseous elements then condense on the wafer, where they may react with each other. In the example of gallium and arsenic, single-crystal gallium arsenide is formed. When evaporation sources such as copper or gold are used, the gaseous elements impinging on the surface may be adsorbed (e.g., after a time window where the impinging atoms will hop around the surface) or reflected. Atoms on the surface may also desorb.

Controlling the temperature of the source will control the rate of material impinging on the substrate surface and the temperature of the substrate can affect the rate of hopping or desorption. The term "beam" means that evaporated atoms do not interact with each other or vacuum chamber gases until they reach the wafer, due to the long mean free paths of the atoms.

In an embodiment of the present technology, the substrate 12 (of FIG. 1) comprises aluminum oxide ($Al_2O_3$).

In another embodiment of the present technology, the substrate 12 (of FIG. 1) comprises aluminum nitride (AlN).

In yet another embodiment of the present technology, the substrate 12 (of FIG. 1) comprises indium-tin-oxide (InTnO).

Indium tin oxide (ITO) is a ternary composition of indium, tin and oxygen in varying proportions. Depending on the oxygen content, it can either be described as a ceramic or alloy. Indium tin oxide is typically encountered as an oxygen-saturated composition with a formulation of 74% In, 18% $O_2$, and 8% Sn by weight. Oxygen-saturated compositions are so typical, that unsaturated compositions are termed oxygen-deficient ITO. It is transparent and colorless in thin layers, while in bulk form it is yellowish to grey. In the infrared region of the spectrum it acts as a metal-like mirror.

Indium tin oxide is one of the most widely used transparent conducting oxides because of its two main properties: its electrical conductivity and optical transparency, as well as the ease with which it can be deposited as a thin film. As with all transparent conducting films, a compromise must be made between conductivity and transparency, since increasing the thickness and increasing the concentration of charge carriers increases the material's conductivity, but decreases its transparency. Thin films of indium tin oxide are most commonly deposited on surfaces by physical vapor deposition. Often used is electron beam evaporation, or a range of sputter deposition techniques.

In yet another embodiment of the present technology, the substrate 12 (of FIG. 1) comprises silicon (Si).

Silicon is a chemical element with symbol Si and atomic number 14. A hard and brittle crystalline solid with a blue-gray metallic luster, it is a tetravalent metalloid. It is a member of group 14 in the periodic table, along with carbon above it and germanium, tin, lead, and flerovium below. It is rather unreactive, though less so than germanium, and has great chemical affinity for oxygen; as such, it was first prepared and characterized in pure form only in 1823 by Jöns Rims Jakob Berzelius.

Silicon is the eighth most common element in the universe by mass, but very rarely occurs as the pure element in the Earth's crust. It is most widely distributed in dusts, sands, planetoids, and planets as various forms of silicon dioxide (silica) or silicates. Over 90% of the Earth's crust is composed of silicate minerals, making silicon the second most abundant element in the Earth's crust (about 28% by mass) after oxygen. A very highly purified silicon is used in integrated circuits.

In yet another embodiment of the present technology, the substrate 12 (of FIG. 1) comprises silicone on sapphire (SoS).

Silicon on sapphire (SOS) is a hetero-epitaxial process for integrated circuit manufacturing that consists of a thin layer (typically thinner than 0.6 μm) of silicon grown on a sapphire ($Al_2O_3$) wafer.

SOS is part of the Silicon on Insulator (SOI) family of CMOS technologies. Typically, high-purity artificially grown sapphire crystals are used. The silicon is usually deposited by the decomposition of silane gas (SiH4) on heated sapphire substrates. The advantage of sapphire is that it is an excellent electrical insulator, preventing stray currents caused by radiation from spreading to nearby circuit elements. SOS faced early challenges in commercial manufacturing because of difficulties in fabricating the very small transistors used in modern high-density applications. This is because the SOS process results in the formation of dislocations, twinning and stacking faults from crystal lattice disparities between the sapphire and silicon. Additionally, there is some aluminum, a p-type dopant, contamination from the substrate in the silicon closest to the interface.

The application of epitaxial growth of silicon on sapphire substrates for fabricating MOS devices involves a silicon purification process that mitigates crystal defects which result from a mismatch between sapphire and silicon lattices. For example, Peregrine Semiconductor's SP4T switch is formed on an SOS substrate where the final thickness of silicon is approximately 95 nm. Silicon is recessed in regions outside the polysilicon gate stack by poly oxidation and further recessed by the sidewall spacer formation process to a thickness of approximately 78 nm.

In yet another embodiment of the present technology, the substrate 12 (of FIG. 1) comprises and magnesium oxide (MgO).

Magnesium oxide (MgO), or magnesia, is a white hygroscopic solid mineral that occurs naturally as periclase and is a source of magnesium. It has an empirical formula of MgO and consists of a lattice of $Mg_2$ (+ions) and $O_2$ (−ions) held together by ionic bonding. Magnesium hydroxide forms in the presence of water ($MgO+H_2O \rightarrow Mg(OH)_2$), but it can be reversed by heating it to separate moisture.

Magnesium oxide was historically known as magnesia alba (literally, the white mineral from magnesia–other sources give magnesia alba as $MgCO_3$), to differentiate it from magnesia negra, a black mineral containing what is now known as manganese. While "magnesium oxide" normally refers to MgO, magnesium peroxide $MgO_2$ is also known as a compound. Per evolutionary crystal structure prediction, $MgO_2$ is thermodynamically stable at pressures above 116 GPa (gigapascals), and a totally new semiconducting suboxide $Mg_3O_2$ is thermodynamically stable above 500 GPa. Because of its stability, MgO is used as a model system for investigating vibrational properties of crystals. Magnesium oxide is produced by the calcination of magnesium carbonate or magnesium hydroxide.

In an embodiment of the present technology, referring still to FIG. 1, the bottom electrode 14 is selected from the group of materials consisting of: cobalt iron alloy ($Co_{0.5}$ $Fe_{0.5}$); silver (Ag); gold (Au); platinum (Pt); cobalt (Co); palladium (Pd); titanium (Ti); and titanium tungsten (TiW).

Each of these materials can be deposited on a substrate by either Molecular beam epitaxy (MBE) (please, see the discussion above), or by sputter deposition.

Sputter deposition is a physical vapor deposition (PVD) method of thin film deposition by sputtering. This involves ejecting material from a "target" that is a source onto a "substrate" such as a silicon wafer. Re-sputtering is re-emission of the deposited material during the deposition process by ion or atom bombardment. Sputtered atoms ejected from the target have a wide energy distribution, typically up to tens of eV (100,000 K). The sputtered ions (typically only a small fraction of the ejected particles is ionized—on the order of 1%) can ballistically fly from the target in straight lines and impact energetically on the substrates or vacuum chamber (causing re-sputtering).

Alternatively, at higher gas pressures, the ions collide with the gas atoms that act as a moderator and move diffusively, reaching the substrates or vacuum chamber wall and condensing after undergoing a random walk. The entire range from high-energy ballistic impact to low-energy thermalized motion is accessible by changing the background gas pressure.

The sputtering gas is often an inert gas such as argon. For efficient momentum transfer, the atomic weight of the sputtering gas should be close to the atomic weight of the target, so for sputtering light elements neon is preferable, while for heavy elements krypton or xenon are used. Reactive gases can also be used to sputter compounds. The compound can be formed on the target surface, in-flight or on the substrate depending on the process parameters. The availability of many parameters that control sputter deposition make it a complex process, but also allow experts a large degree of control over the growth and microstructure of the film.

An important advantage of sputter deposition is that even materials with very high melting points are easily sputtered while evaporation of these materials in a resistance evaporator or Knudsen cell is problematic or impossible. Sputter deposited films have a composition close to that of the source material. The difference is due to different elements spreading differently because of their different mass (light elements are deflected more easily by the gas) but this difference is constant.

Sputtered films typically have a better adhesion on the substrate than evaporated films. A target contains a large amount of material and is maintenance free making the technique suited for ultrahigh vacuum applications.

Sputtering sources contain no hot parts (to avoid heating they are typically water cooled) and are compatible with reactive gases such as oxygen. Sputtering can be performed top-down while evaporation must be performed bottom-up. Advanced processes such as epitaxial growth is possible.

Some disadvantages of the sputtering process are that the process is more difficult to combine with a lift-off for structuring the film. This is because the diffuse transport, characteristic of sputtering, makes a full shadow impossible. Thus, one cannot fully restrict where the atoms go, which can lead to contamination problems. Also, active control for layer-by-layer growth is difficult compared to pulsed laser deposition and inert sputtering gases are built into the growing film as impurities.

Pulsed laser deposition is a variant of the sputtering deposition technique in which a laser beam is used for sputtering. Role of the sputtered and re-sputtered ions and the background gas is fully investigated during the pulsed laser deposition process.

Sputtering sources often employ magnetrons that utilize strong electric and magnetic fields to confine charged plasma particles close to the surface of the sputter target. In a magnetic field, electrons follow helical paths around magnetic field lines, undergoing more ionizing collisions with gaseous neutrals near the target surface than would otherwise occur. (As the target material is depleted, a "racetrack" erosion profile may appear on the surface of the target.)

The sputter gas is typically an inert gas such as argon. The extra argon ions created because of these collisions lead to a higher deposition rate. The plasma can also be sustained at a lower pressure this way. The sputtered atoms are neutrally charged and so are unaffected by the magnetic trap.

Charge build-up on insulating targets can be avoided with the use of RF sputtering where the sign of the anode-cathode bias is varied at a high rate (commonly 13.56 MHz). RF sputtering works well to produce highly insulating oxide films but with the added expense of RF power supplies and impedance matching networks. Stray magnetic fields leaking from ferromagnetic targets also disturb the sputtering process. Specially designed sputter guns with unusually strong permanent magnets must often be used in compensation.

In an embodiment of the present technology, referring still to FIG. 1, the bottom layer 16 is selected from the group of materials consisting of: chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$ (CMS); and Heusler alloy $Co_2FeAl_{0.5}Si_{0.5}$ (CFAS).

For example, in the paper published recently in Nat Commun., 2014 May 30; 5: 3974. "Direct observation of half-metallicity in the Heusler compound Co2MnSi" by M. Jourdan et al., Co2MnSi samples were prepared and investigated completely in situ in an ultrahigh vacuum cluster consisting of sputtering chambers, an molecular beam epitaxy (MBE) chamber, and a Synchrotron radiation ultraviolet photoemission spectroscopy (SRUPS) chamber equipped with a He gas discharge lamp (hv=21.2 eV) and a hemispherical energy analyzer with multi-channel spin filter (energy resolution=400 meV, Sherman function S=0.42±0.05). First, an epitaxial buffer layer of the Heusler compound Co2MnGa (30 nm) was grown on the MgO (100) substrate by radio frequency (RF)-sputtering at room temperature. By an optimized additional annealing process at 550° C. L21 order was obtained as shown by high energy electron diffraction (RHEED) and X-ray diffraction (XRD). Co2MnSi (70 nm) was RF-sputtered on top at room temperature. Induced by the buffer layer the Co2MnSi thin films showed already some degree of $L2_1$ surface order as deposited. By additional annealing the order was improved as was demonstrated for the film surface by RHEED.

In an embodiment of the present technology, referring still to FIG. 1, the tunnel junction 18 is selected from the group of materials consisting of: magnesium oxide (MgO); aluminum oxide ($Al_2O_3$); and spinel $MgAl_2O_4$.

For example, in the paper "Low-temperature atomic layer deposition of MgO thin films on Si" by S Vangelista et al., published in Journal of Physics D: Applied Physics, Volume 46, Number 48, Magnesium oxide (MgO) films have been grown by atomic layer deposition in the wide deposition temperature window of 80-350° C. by using bis (cyclopentadienyl) magnesium and $H_2O$ precursors. MgO thin films were deposited on both HF-last Si (1 0 0) and $SiO_2$/Si substrates at a constant growth rate of ~0.12 nm $cycle^{-1}$. The structural, morphological and chemical properties of the synthesized MgO thin films were investigated by x-ray reflectivity, grazing incidence x-ray diffraction, time-of-flight secondary ion mass spectrometry and atomic force microscopy measurements. MgO layers were characterized by sharp interface with the substrate and limited surface roughness, besides good chemical uniformity and polycrystalline structure for thickness above 7 nm. CV measurements were performed on Al/MgO/Si MOS capacitors, with MgO in the (4.6-11) nm thickness range, which allowed determining a dielectric constant (κ)~11. Co layers were grown by chemical vapor deposition in direct contact with MgO without vacuum-break (base pressure $10^{-5}$-$10^{-6}$ Pa). The as-grown Co/MgO stacks showed sharp interfaces and no elements inter diffusion among layers. C-V and I-V measurements have been conducted on Co/MgO/Si MOS capacitors. The dielectric properties of MgO were not influenced by the further process of Co deposition.

In an embodiment of the present technology, referring still to FIG. 1, the spin injector 20 is selected from the group of materials consisting of: chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$; and Heusler alloy $Co_2FeAl_{0.5}Si_{0.5}$ (CFAS).

For example, in the paper "Structural and magnetic properties and tunnel magnetoresistance for $Co_2(Cr,Fe)Al$ and $Co_2FeSi$ full-Heusler alloys" by K Inomata et al., published in Journal of Physics D: Applied Physics, Volume 39, Number 5, the structure and magnetization of $Co_2$ $(Cr_1\text{\textasciitilde}xFex)Al$ ($0 \le x \le 1$) and $Co_2FeSi$ full-Heusler alloy have been investigated. The films were deposited on thermally oxidized Si ($SiO_2$) and MgO (001) single crystal substrates by ultra-high vacuum sputtering at various temperatures. The films were also post-annealed after deposition at room temperature (RT). Magnetic tunnel junctions with a full-Huesler alloy electrode were fabricated with a stacking structure of $Co_2YZ$ (20 nm)/Al (1.2 nm)-oxide/$Co_{75}Fe_{25}$ (3 nm)/IrMn (15 nm)/Ta (60 nm) and microfabricated using electron beam lithography and Ar ion etching with a $10^2$ μm$^2$ junction area, where $Co_2YZ$ stands for $Co_2(Cr_1\text{\textasciitilde}xFex)Al$ or $Co_2FeSi$. The tunnel barriers were formed by the deposition of 1.2 nm Al, followed by plasma oxidization in the chamber. The x-ray diffraction revealed the A2 or B2 structure depending on heat treatment conditions and the substrate, but not $L2_1$ structure for the $Co_2(Cr_1\text{\textasciitilde}xFex)Al$ ($0 \le x \le 1$) films. The $L2_1$ structure, however, was obtained for the $Co_2FeSi$ films when deposited on a MgO (001) substrate at elevated temperatures above 473 K. The maximum tunneling magnetoresistance (TMR) was obtained with 52% at RT and 83% at 5 K for a junction using a $Co_2(Cr_{0.4}Fe_{0.6})Al$ electrode. While the junction using a $Co_2FeSi$ electrode with the $L2_1$ structure exhibited the TMR of 41% at RT and 60% at 5 K, which may be improved by using a buffer layer for reducing the lattice misfit between the $Co_2FeSi$ and MgO (001) substrate.

In an embodiment of the present technology, referring still to FIG. 1, the pinning layer 22 is selected from the group of materials consisting of: iridium manganese chromium (IrMnCr); iridium manganese (IrMn); nickel manganese (NiMn); nickel manganese chromium (NiMnCr); nickel manganese iron (NiMnFe); nickel manganese iridium (NiMnIr); nickel manganese palladium (NiMnPd); nickel manganese platinum (NiMnPt); nickel manganese rhodium (NiMnRh); platinum-manganese (PtMn), and nickel manganese ruthenium (NiMnRu).

For example, in the paper "Magnetic Tunnel Junction Materials for Electronic Applications" by J. M. Slaughter et al., published in JOM-e, 52 (6) (2000), a ferromagnetic thin film is pinned when placed in contact with an antiferromagnetic (AF) thin film due to exchange coupling. For an uncoupled, free, ferromagnetic film, the magnetic orientation of the film displays a hysteretic behavior pointing in the direction of the last applied saturating field. If a saturating field is applied and then taken away, the magnetic orientation of this free film will be in the direction of that field. If the direction of the applied saturating field is reversed and again taken away, the magnetic orientation of the film will be reversed. Thus, in zero applied field, either orientation is possible. A ferromagnetic film pinned by an AF layer displays similar behavior, but has an offset. In zero field, the ferromagnetic film will align in one direction. An exchange coupling between the ferromagnetic and AF layers, at their mutual interface, causes the ferromagnetic layer to be preferentially aligned in one direction. For the memory devices in question, this preferential alignment or pinning is used to lock one layer in a fixed direction. Much of this work on AF pinning materials, and of others in the field, has revolved around manganese-based antiferromagnetic materials such as Pt—Mn, Ir—Mn, Rh—Mn, and Fe—Mn. Pt—Mn was a particularly interesting pinning material because it remained antiferromagnetic at relatively high temperatures. Unlike many of the commonly used AF alloys, as-deposited Pt—Mn is not AF. Instead, this material must be post annealed, resulting in a phase transformation from face-centered cubic (f.c.c.) to a face-centered tetragonal (f.c.t.) crystal structure. The f.c.t. phase of Pt—Mn is AF and will pin an adjacent ferromagnetic film. The pinning strength increases with annealing time. The shift and broadening of the Ni—Fe hysteresis loop in the annealed material is characteristic of a pinned ferromagnetic film. Once pinned, the exchange bias causes the magnetic orientation of the film to be in one direction at zero applied field.

In an embodiment of the present technology, referring still to FIG. 1, the pinning layer 22 further comprises a Ruderman-Kittel-Kasuya-Yosida (RUDERMAN-KITTEL-KASUYA-YOSIDA (RKKY)) non-magnetic pinning layer.

Figure 2:
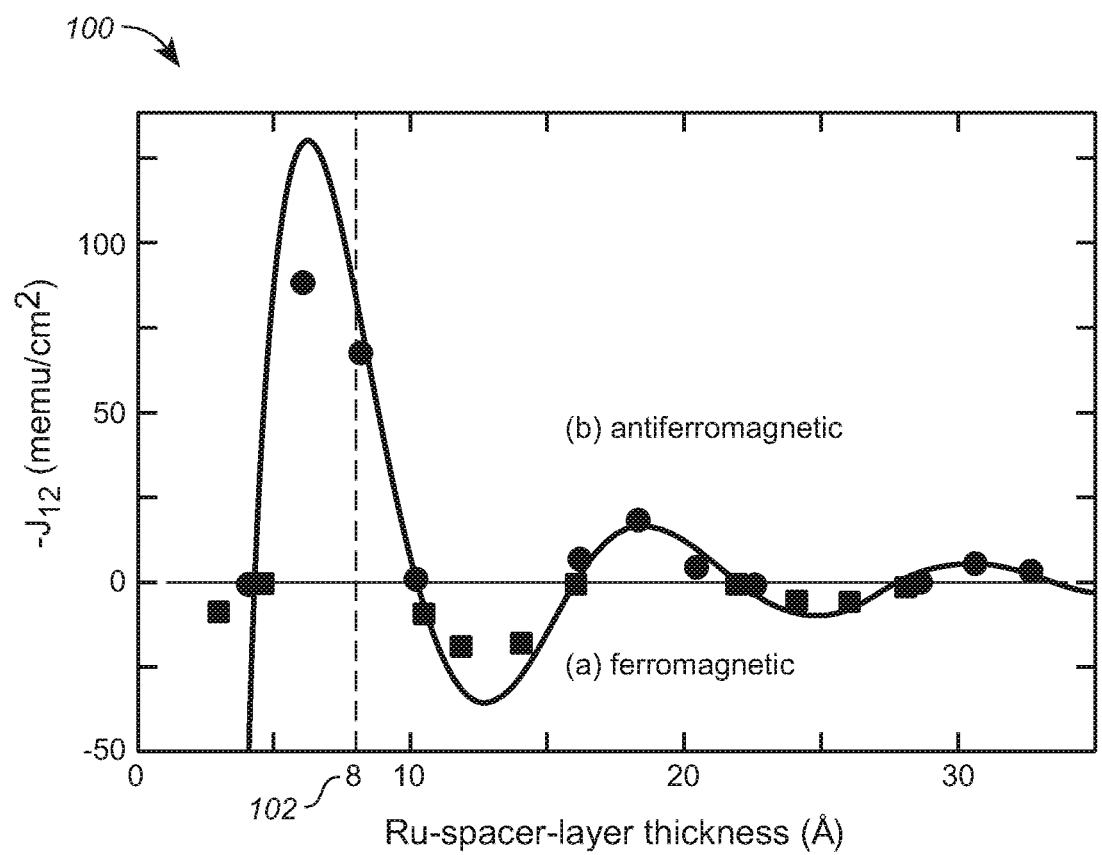
FIG. 2 illustrates the dependence of the RUDERMAN-KITTEL-KASUYA-YOSIDA (RKKY) interaction on the spacing layer thickness for Ruthenium (Ru) for the purposes of the present technology.

As it is illustrated in FIG. 2, the RKKY interaction 100 exhibits the antiferromagnetic polarity for a Ruthenium spacer having the layer thickness at about 8 Å (e.g., at location 102 of the RKKY interaction 100). For the reference, please see S. S. P. Parkin, "Spin Engineering: Direct determination of the Ruderman-Kittel-Kasuya-Yosida far-field function in ruthenium", Phys. Rev B 44 (13), 1991.

In an embodiment of the present technology, using a Ru spacer as a pinning layer (pinning layer 22 of FIG. 1) with thickness of about 8 Å, magnetization of the spin injector 20 can be oriented antiparallel to the magnetization of the bottom layer 16 to allow injection of the maximum minority current into the bottom layer 16 comprising the Magnon Gain Medium. The injection of maximum minority current would substantially simplify reaching the magnon lazing point.

In an embodiment of the present technology, referring still to FIG. 1, the reference layer 24 comprises a ferromagnetic material that is used to select the orient of the bottom layer 16 in a certain direction.

In an embodiment of the present technology, the reference layer 24 (e.g., a free layer) can be implemented by using CFA (B2-ordered Co2FeAl).

For the reference, please see: Hiroaki Sukegawa, Zhenchao Wen, Kouta Kondou, Shinya Kasai, Seiji Mitani, and Koichiro Inomata; Applied Physics Letters 100, 182403 (2012); "Spin-transfer switching in full-Heusler Co2FeAl-based magnetic tunnel junctions".

In an embodiment of the present technology, referring still to FIG. 1, the top electrode 28 is selected from the group of materials consisting of: cobalt iron alloy (Co0.5 Fe 0.5); silver (Ag); gold (Au); platinum (Pt); cobalt (Co); palladium (Pd); titanium (Ti); and titanium tungsten (TiW). Each of these materials can be deposited by either MBE or sputtering.

In an embodiment of the present technology, referring still to FIG. 1, both the spin injector 20 and the pinning layer 22 are replaced by a single layer of electron injector. In this embodiment, the electron injector is selected from the group of materials consisting of: a metal; a metal alloy; a ferromagnetic metal; and a ferromagnetic alloy.

In an embodiment of the present technology, the terahertz magnon laser 10 (of FIG. 1) generates terahertz radiation based on magnon laser effect. For the reference, please see U.S. Pat. Nos. 7,430,074; 7,508,578; 9,136,665. In an aspect, a voltage bias 74 can be applied to the bottom electrode 14 and the top electrode 28 to facilitate generation of the terahertz radiation.

The essence of the terahertz radiation based on magnon laser effect is as follows. A Magnon Gain Medium (MGM) comprises a conduction band that is split into two sub bands separated by an exchange energy gap, a first sub band having spin up, and a second sub band having spin down (not shown).

In the case of conventional lasing, if an atom is already in the excited state (that is, there is population inversion, it may be perturbed by the passage of a photon that has a frequency $v_{21}$ corresponding to the energy gap $\Delta E$ of the excited state L2 to ground state L1 (Level 1) transition. In this case, the excited atom relaxes to the ground state, and is induced to produce a second photon of frequency $v_{21}$. The original photon is not absorbed by the atom, and so the result is two photons of the same frequency. This process is known as stimulated emission. With the stimulated emission, the induced photon has the same frequency and phase as the incident photon. In other words, the two photons are coherent. As such, optical amplification can be provided, as well as production of a laser system.

The magnon lasing process (I. Ya. Korenblit and B. G. Tankhilevich, High frequency magnon generation by non-equilibrium electrons and stability of the magnon state, Phys. Lett. A, 64, 307 (1977)) can be implemented in ferromagnets with an exchange gap, $\Delta$, in the electron spectrum, namely, in ferromagnetic semiconductors and half metals.

Figure 3:
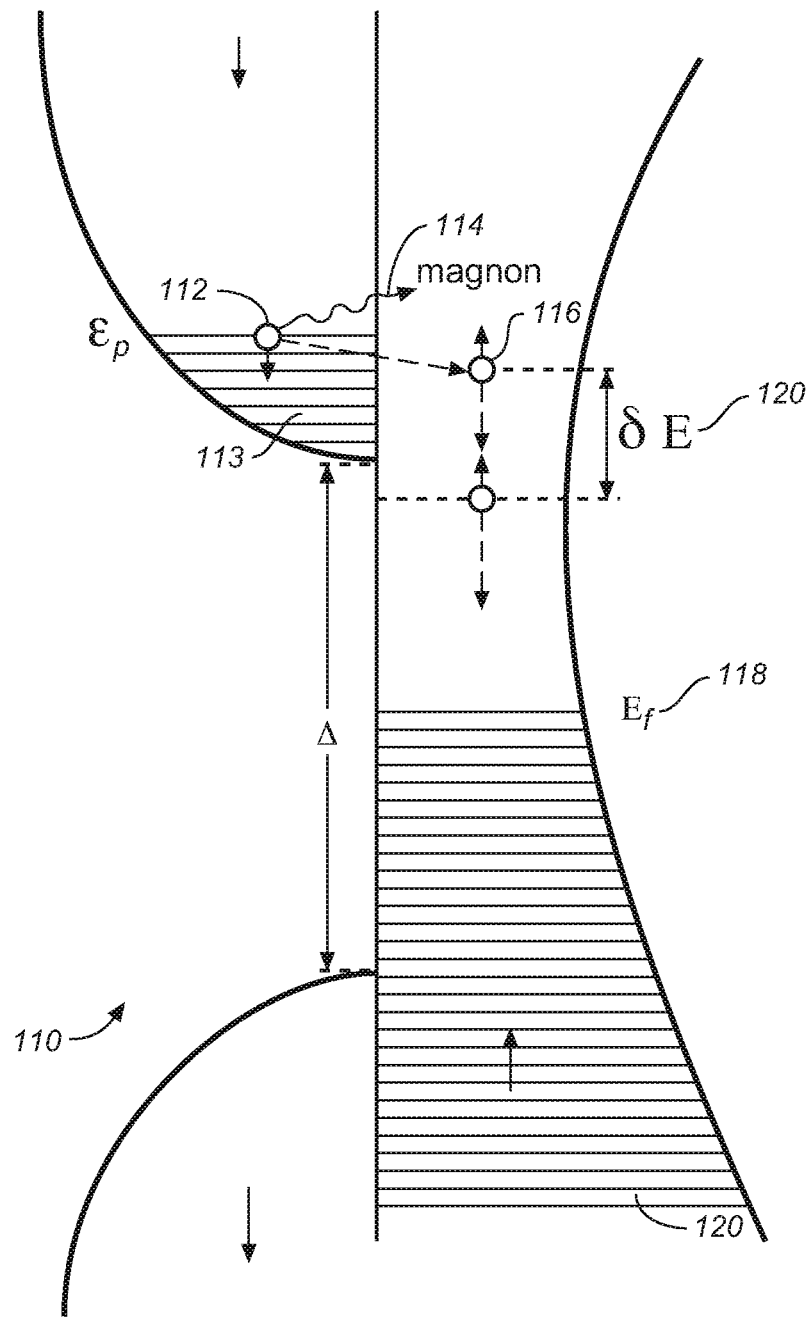
FIG. 3 shows the electron spectrum and generation of non-equilibrium magnons in half-metals for the purposes of the present technology.

FIG. 3 illustrates a system 110 with magnon lasing in half-metals. In an aspect, a minority electron 112 injected into a sub band with spin down 113 passes into a high-energy state 116 in the sub band with spin up 120 by emitting an acoustical magnon 114 (at the time about $10^{-12}$ sec) and after that rapidly loses its energy by relaxing on the equilibrium electrons at Fermi level 118 (at the time about $10^{-13}$ sec) before reabsorbing the same magnon. As a result, the electron strongly reduces its energy by an amount $\delta E$ 120 associated with its relaxation on an electron with spin up having Fermi energy and cannot, therefore, return back into the sub-band with spin down by re-absorbing a magnon.

The number of nonequilibrium acoustical magnons depends on the ratio of magnon-electron damping rate $\Gamma_e$ to the magnon-magnon damping rate $\Gamma_m$ and reaches its max at the Max "birth" rate $\Gamma_e$ and Min "death" rate $\Gamma_m$. This corresponds to the biggest population of non-equilibrium magnons. The lasing frequency corresponds to the minimum magnon wave vector $q=(p_0-p)/\hbar$ because the magnon-electron damping $\Gamma_e$ is proportional to $q^{-1}$; and the magnon-magnon damping $\Gamma_m$ is proportional to $q^4$ so that $\Gamma_e/\Gamma_m$ is proportional to $q^{-5}$. Relaxation of non-equilibrium magnons on the borders of a sample happens many times before non-equilibrium magnon will scatter on equilibrium magnon. But these border processes are irrelevant as they are elastic and do not change the energy of magnons, whereas the change of momentum in isotropic system is not important. Thus, for magnon laser the minimum magnon wave vector $q=(p_0-p)/\hbar$ determines the lasing frequency:

$$\omega_{lasing}(q_{lasing})=D((p_0-p)/\hbar)^2, \quad (Eq. 1)$$

where D is magnon stiffness.

Merging of two magnons with frequency f and almost equal antiparallel wave vectors with orientations (q/|q| and (−) q/|q|) generates a photon with frequency 2f. This process is a reversal of a well-known process of parametric magnon generation by electromagnetic radiation. It is easy to see that the desired pairs of magnons having orientations of their momentum vectors (q/|q| and (−) q/|q|) respectively are always generated by the electron current. Indeed, the Fermi velocities of the electrons in the current are directed randomly in all directions, since the drift velocity is very small comparatively to the Fermi velocity. Hence, among the injected electrons there are always two electrons with equal but antiparallel momentums. It follows from the energy and momentum conservation laws that such electrons generate two magnons with equal and antiparallel wave vectors, the angle between vector (+) p/|q| and vector q/|q| being: cos (p, q)=$(\hbar q)^2-p^2_0)/2pq\hbar$. It follows from this relationship that for magnons with |q| close to the lasing momentum $q_1$ is almost antiparallel to vector p. At a critical pumping current density j=$10^4$–$10^6$ A/cm$^2$ (the required critical pumping is of the same order of magnitude as required in the case of the conventional semiconductor laser), the magnon lasing process begins, and the device should generate high-power narrow-frequency THz radiation.

For example, the estimation of the lasing frequency of the THz radiation in Co$_2$MnSi (001)/MgO heterostructures can provide a stiffness D=466 meV(Å)$^2$ (according to Ritchie L. et al., Phys. Rev. B 68, 104430) or 567 meV(Å)$^2$ (according to Jan Thoene, Stanislav Chadov, Gerhard Fecher, Claudia Felser, Jurgen Kubler) J. Phys. D: Appl. Phys. 42 (2009) 084013)), an Energy gap $\Delta$=0.6 eV (Bjorn Hulsen and Matthias Scheffler; Phys. Rev Let. 103, 046802 (2009).), and an Effective electron mass $m_{eff}$=(1.15-1.67) $m_0$ (Steffen Kaltenborn and Hans Christian Schneider, Phys. Rev B 88, 045124 (23013). The energy of THz can be double of min frequency of the non-equilibrium magnon (at magnon lazing point)

$\hbar f_{THz}$=2D$(q_1)^2$=>For D=466 meV(Å)$^2$=>f=(10.76-13.63) THz>;

For D=567 meV(Å)$^2$=>f=(13.10-20.24) THz

For the terahertz magnon laser 10 to operate effectively at room temperatures it is paramount to have the maximum possible polarization such that the majority electrons with spin up located in the sub band with spin up are the only electrons present in the half-metal in the equilibrium state. Researchers in Johannes Gutenberg University of Mainz directly observed at room temperature the 100-percent spin polarization of a Heusler compound Co2MnSi (CMS) having a high Curie temperature of 985 K.

In an aspect, the terahertz magnon laser 10 can be operational at room temperatures by (a) injecting minority electrons with spin down into the upper sub-band of the half metal, and (b) injecting a threshold critical minority electron current density into upper sub-band to achieve a start of a magnon lasing process.

Figure 4:
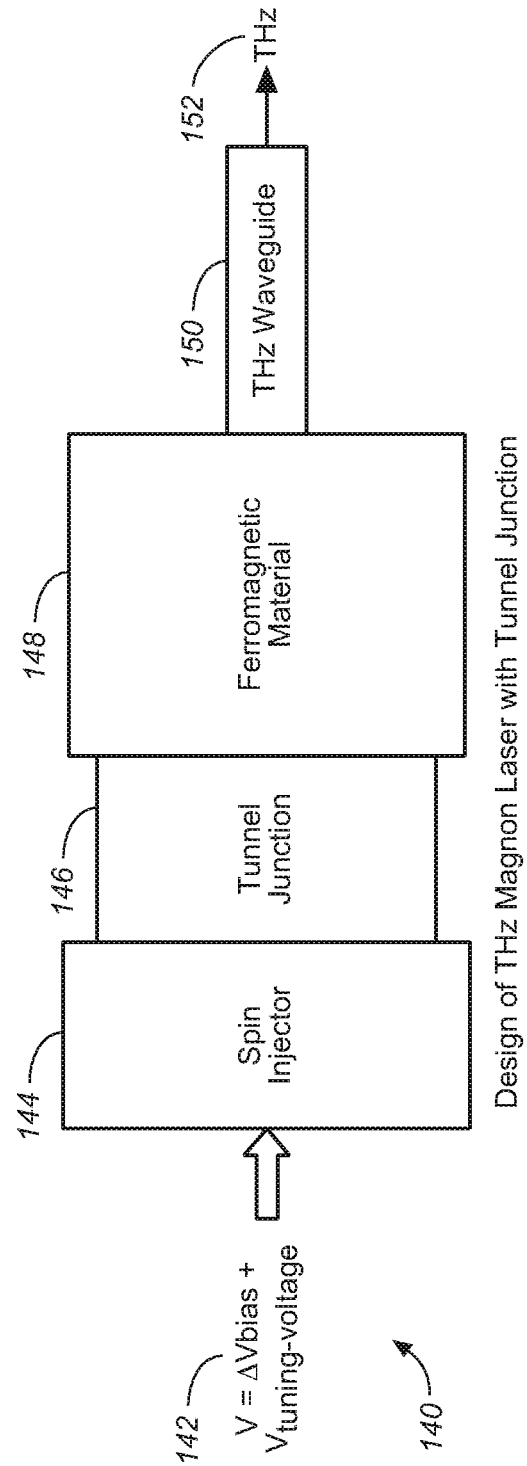
FIG. 4 depicts design of a tunable terahertz magnon laser with tunnel junction for the purposes of the present technology.

In an embodiment of the present technology, FIG. 4 depicts the general design of a voltage-based tunable terahertz magnon laser 140 comprising a spin injector 144, a tunnel junction 146, a ferromagnetic material 148, and a THz waveguide 150. In an embodiment, the THz waveguide can be implemented by using one or more 3D printing techniques. In an aspect, the ferromagnetic material 148 can include a Magnon Gain Medium.

Figure 5:
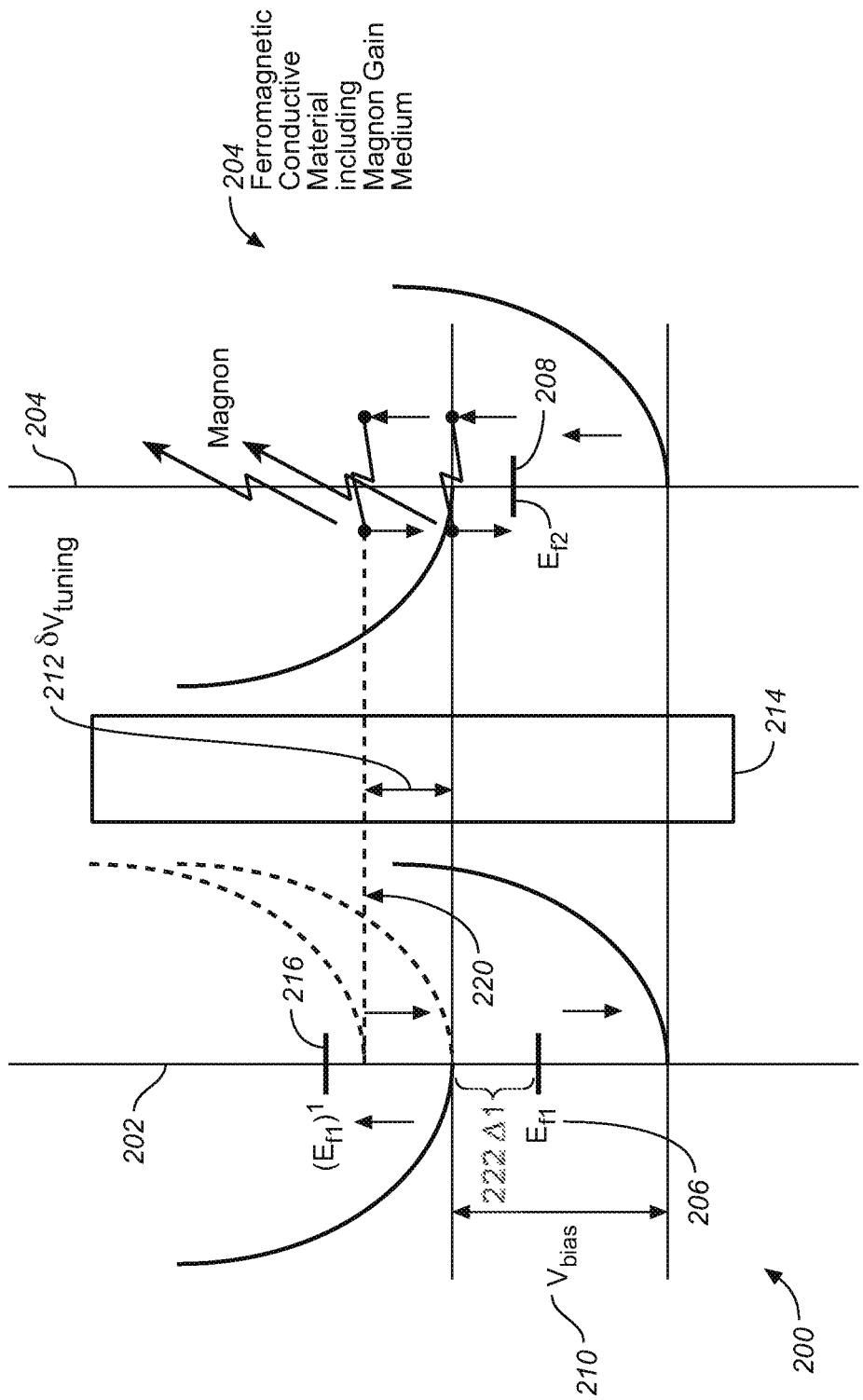
FIG. 5 illustrates the mechanism of continuous voltage-based tuning of a tunable terahertz magnon laser with tunnel junction of FIG. 4 for the purposes of the present technology.

In an embodiment of the present technology, FIG. 5 illustrates a mechanism 200 of continuous voltage-based tuning of the magnon laser 140 of FIG. 4.

In general, increase of a voltage bias 210 causes increase of minority current by increasing the minority carriers in the sub band with spin down 202 (having Fermi level $E_{f1}$ 216). Indeed, the tunneling of minority electron 220 with max energy via the tunnel junction 214 has the highest probability to propagate into the sub band with spin up 204 (having Fermi level $E_{f2}$ 208) by flipping its spin and to generate magnons with the smallest possible magnon lasing wave vector $q=(p_0-ps_{\varepsilon_{max}})/\hbar$ that corresponds to the momentum of electron that tunnels with the max energy $\varepsilon_{max}$.

The further increase of bias after the lasing point is reached causes further increase of the max energy and momentum of electrons with the highest tunneling probability, which causes further decrease of magnon lasing wave vector and further corresponding decrease of THz frequency.

More specifically, the tuning in this system can be achieved by changing the bias voltage 210. In an embodiment, the voltage bias 210 can correspond to $V_{bias}=(\Delta 1+\varepsilon_p)$ by dV. It will result in changing the lasing frequency (tuning) by df:

$$(df/f)=-(dV/V)(\Delta/\varepsilon_p)^{1/2} \qquad \text{(Eq. 2)}$$

Thus, the tuning of lasing frequency is parametrically larger than the shift in bias voltage because small changes in bias result in large changes in the electron energy and therefore in large changes in lasing frequency. Thus, an entire THz band can be covered at least in the range of (1-30) THz by using voltage-based tuning.

For instance, for $\Delta/\varepsilon_p \approx 10^2$; if $dV/V \approx 1\%$ $df/f \approx 10\%$, the THz frequency region between $f_{max}$ and $0.9 f_{max}$ can be covered by changing the tuning voltage by just 1%.

In an embodiment, a Micro-Synchrotron on a chip can be provided. For instance, a parametrically large $(\Delta/\varepsilon_p)^{1/2}$ frequency range (from THz max down to THz min) and High Output Power can make a THz Magnon laser device effectively a Micro-Synchrotron on a chip because a substantial range of lasing frequencies can be continuously covered by using just one chip-size device.

In an embodiment of the present technology, a method for tuning the frequency of THz radiation is provided. The method utilizes the apparatus of FIG. 4 comprising the spin injector 144, the tunnel junction 146 coupled to the spin injector, and the ferromagnetic material 148 coupled to the tunnel junction 146. The ferromagnetic material 148 comprises the Magnon Gain Medium (MGM).

The method for tuning the frequency of THz radiation comprises the step of applying a bias voltage 142 to shift a Fermi level of the spin injector 144 with respect to a Fermi level of the ferromagnetic material 148 to initiate generation of non-equilibrium magnons by injecting minority electrons into the Magnon Gain Medium of the ferromagnetic material 148.

An injected minority electron passes into high energy electronic states in a lower sub band with spin up of the ferromagnetic material by flipping its spin during exchange process. During this process a non-equilibrium magnon is generated. The interaction between the generated non-equilibrium magnons causes generation of the THz electromagnetic radiation.

The method further comprises the step of tuning a frequency of the generated THz radiation by changing the value of the bias voltage 142.

Figure 6:
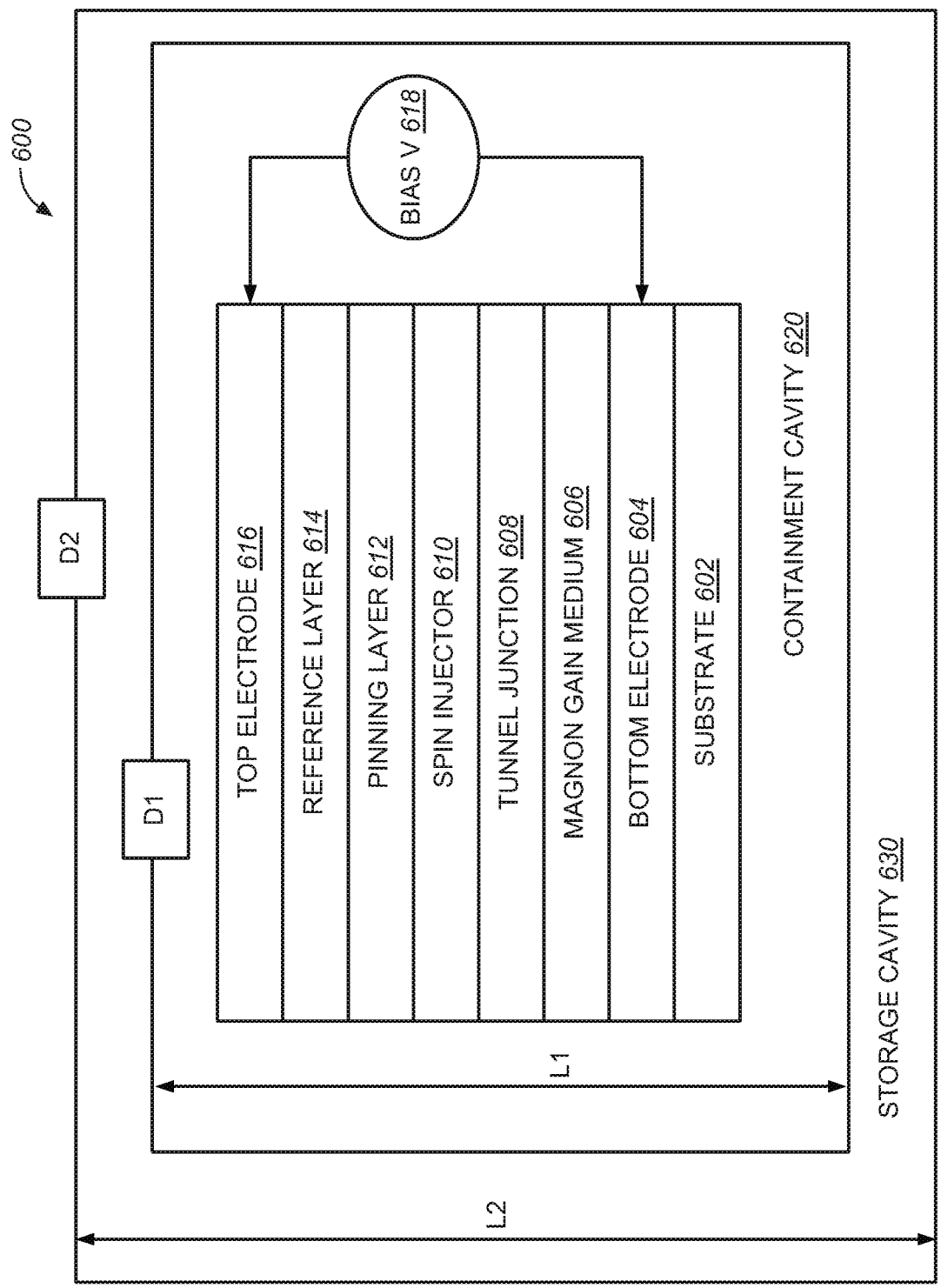
FIG. 6 illustrates an example apparatus according to an aspect of the subject disclosure.

FIG. 6 illustrates an example embodiment of a coherent terahertz magnon laser 600. It includes at least one multilayer tunable microcolumn comprising (from the bottom to the top): (1) a substrate 602; (2) a bottom electrode 604; (3) a ferromagnetic material further comprising a Magnon Gain Medium (MGM) 606 coupled to the bottom electrode 604; (4) a tunnel junction 608 coupled to the Magnon Gain Medium 606; (5) a spin injector 610 coupled to the tunnel junction 608; (6) a pinning layer 612 coupled to the spin injector 610; (7) a reference layer 614 coupled to the pinning layer 612; and/or (8) a top electrode 616. The terahertz magnon laser 600 also includes a containment cavity 620 enclosing all multilayer tunable microcolumns in one cavity.

Additionally, the terahertz magnon laser 600 can additionally or alternatively include a storage cavity 630.

As shown in FIG. 6, in the example embodiment that includes the containment cavity 620 but not the storage cavity 630, the terahertz radiation generated by merging of non-equilibrium magnons obtains coherent properties due to the containment cavity 620.

Indeed, the time of splitting of generated terahertz photon back into two non-equilibrium magnons is on the order of $10^{-7}$ sec (the same as the timing of merging of two non-equilibrium magnons into terahertz photon—see above).

On the other hand, the time of escaping of terahertz photon into free space is on the order of $$T_{escape}=\lambda_{THz}/c \text{ (speed of light)}=c/f_{THz}/c=1/f_{THz}; \qquad \text{(Eq. 3)}$$

So, for example, for the photon with the energy 10 THz the escape time is about $10^{-13}$ sec (and for the photon with the energy 1 THz the escape time is about $10^{-12}$ sec) which is much smaller than $10^{-7}$ sec (the time of splitting of generated terahertz photon back into two non-equilibrium magnons).

Therefore, in certain embodiments, the absorption of terahertz photons at the surface of the containment cavity can be ignored (e.g., absorption can be minimized by coating the interior surface of the containment cavity with gold) a simulated radiation process can be initiated for generated terahertz photons (e.g., based on Boson properties of photons) that would result in generation of coherent photons that can be outputted via the outside hole with the dimensions of $d_1$ satisfying the flowing condition:

$$\lambda_{THz} \ll d_1 \ll L_1; \qquad \text{(Eq. 4)}$$

where $\lambda_{THz}$ is the wavelength of the radiated terahertz radiation and $L_1$ is the dimensions of the containment cavity 620. Thus, a multilayer column represents a Terahertz antenna, and the radiating surface of a multilayer column represents a terahertz gain medium.

However, in the embodiment containing only the containment cavity 620, the timing of generation of such coherent terahertz radiation is on the order of $10^{-7}$ sec. This means that this THz radiation can be modulated only up to 10 MHz (one can modulate the radiation only after it is created). In an embodiment, the storage cavity 630 can be provided with dimensions of $L_2$ enclosing the containment cavity 620 with dimensions of $L_1$: $L_2 < L_1$.

The radiation that penetrated into the storage cavity 630 from the containment cavity 620 via a hole D1 can be modulated at any modulation frequency $f_{modulation}$ that is less than the generated terahertz frequency: $f_{THz}$: $f_{modulation} < f_{THz}$:

For practical purposes, if the radiation frequency is 10 THz, the modulation frequency can be as high as 1 THz.

The radiation from the storage cavity 630 can be outputted via an outside hole D2 with dimensions of the outside hole D2 satisfying the flowing condition: $\lambda_{THz} \ll D2 \ll L_2$.

As shown is in FIG. 3, according to an embodiment of the subject disclosure, a ferromagnetic material can include a Magnon Gain Medium (MGM). The MGM includes a conduction band that is split into two sub bands separated by an exchange energy gap, a first sub band having spin up directed along the magnetization of the ferromagnetic material, and a second sub band having spin down directed opposite to the magnetization of the ferromagnetic material. The majority electrons having spin up are located in the first sub band having spin up.

Figure 7:
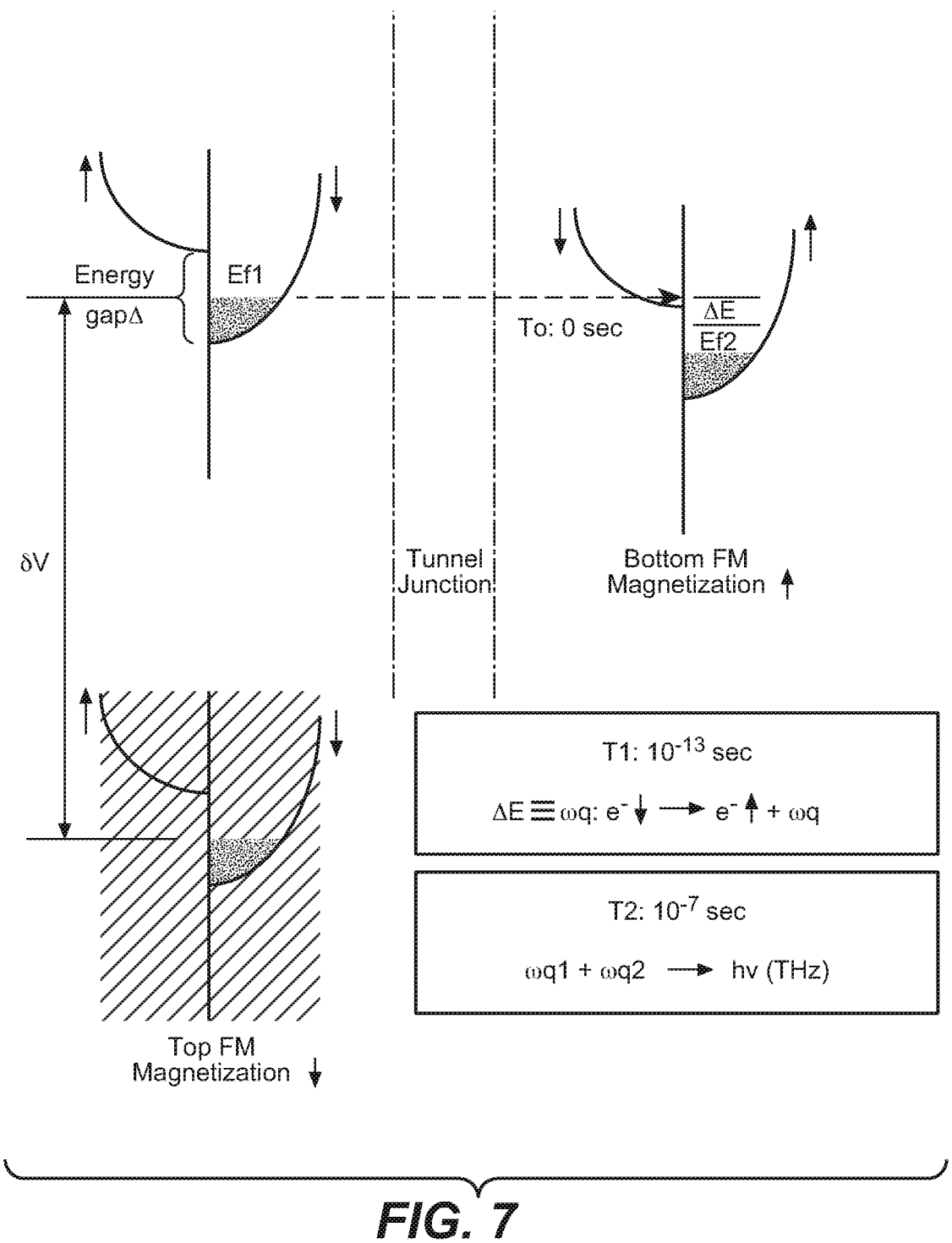
FIG. 7 illustrates an example methodology for generation of non-equilibrium magnons in the Magnon Gain Medium, which in turn results in the generation of terahertz radiation.

As shown in FIG. 7, when a bias voltage δV is applied between the top electrode 616 and the bottom electrode across 604, at least one multilayer tunable microcolumn is configured to shift the Fermi level of the spin injector 610 with respect to the Fermi level of the Magnon Gain Medium 606 (e.g., with respect to the Fermi level of ferromagnetic material that includes the Magnon Gain Medium 606). The minority electrons having spin down are injected into the Magnon Gain Medium 606 from the spin injector 610 by tunneling via the tunnel junction 608 after the Fermi level of the spin injector 610 is shifted with respect to the Fermi level of the Magnon Gain Medium 606 are configured to generate non-equilibrium magnons in the Magnon Gain Medium 606 resulting in generation of terahertz radiation.

In an aspect, FIG. 3 can illustrate physics of a magnon laser.

A nonequilibrium electron put in the upper sub band with spin down rapidly emits a magnon, with a large wave vector $q \cdot \hbar^{-1}$ $(2m\Delta)^{1/2}$, where m is the electron effective mass. It follows from the energy and momentum conservation laws that if the energy of this electron, $\varepsilon_p$, measured from the bottom of the spin down sub band is much smaller than $\Delta$, the wave vector of the emitted magnon, q lies in the interval $q_1 \leq q \leq q_2$, where $q_{1,\,2} = \hbar^{-1}$ $(p_0 \pm p)$, $p_0 = (2m\Delta)^{1/2}$, $p = (2m\,\varepsilon_o)^{1/2} \ll p_0$. The frequency of these magnons lies in the Terahertz region.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore, the nonequilibrium magnon distribution function, $N(\vec{q})$ has a maximum at some wave vector $\vec{q} = \vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$. When the pump reaches some critical value, $N(\vec{q}^*)$ starts to increase very fast with the increase of the electron pumping. At some conditions the generation of magnons with $\vec{q} = \vec{q}^*$ becomes avalanche-like, and the magnon system becomes unstable. For more details, please see references: I. Ya. Korenblit and B. G. Tankhilevich, Soy. Phys.—JETP, 46, 1167 (1977); I. Ya. Korenblit and B. G. Tankhilevich, Soy. Phys.—JETP Lett. 24, 555 (1976); I. Ya. Korenblit and B. G. Tankhilevich, Phys. Lett. A 64, 307 (1977), and equations below. As a result, an intense Terahertz radiation can be obtained.

In an aspect, magnon generation can be provided based on a system of equations.

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Soy. Phys.—JETP, 46, 1167 (1977) in the case for ferromagnetic semiconductors (in the case for half metals we have very similar basic equations).

They read in steady condition $$[1+N(\vec{q})]\Gamma_e(\vec{q})-N(\vec{q})-[N^{(0)}(\vec{q})]\Gamma_m(\vec{q})=0$$

$$f_\downarrow(\vec{p})\gamma_{em}(\vec{p})=g(\varepsilon_p). \qquad \text{(Eqs. 5)}$$

Figure 8:
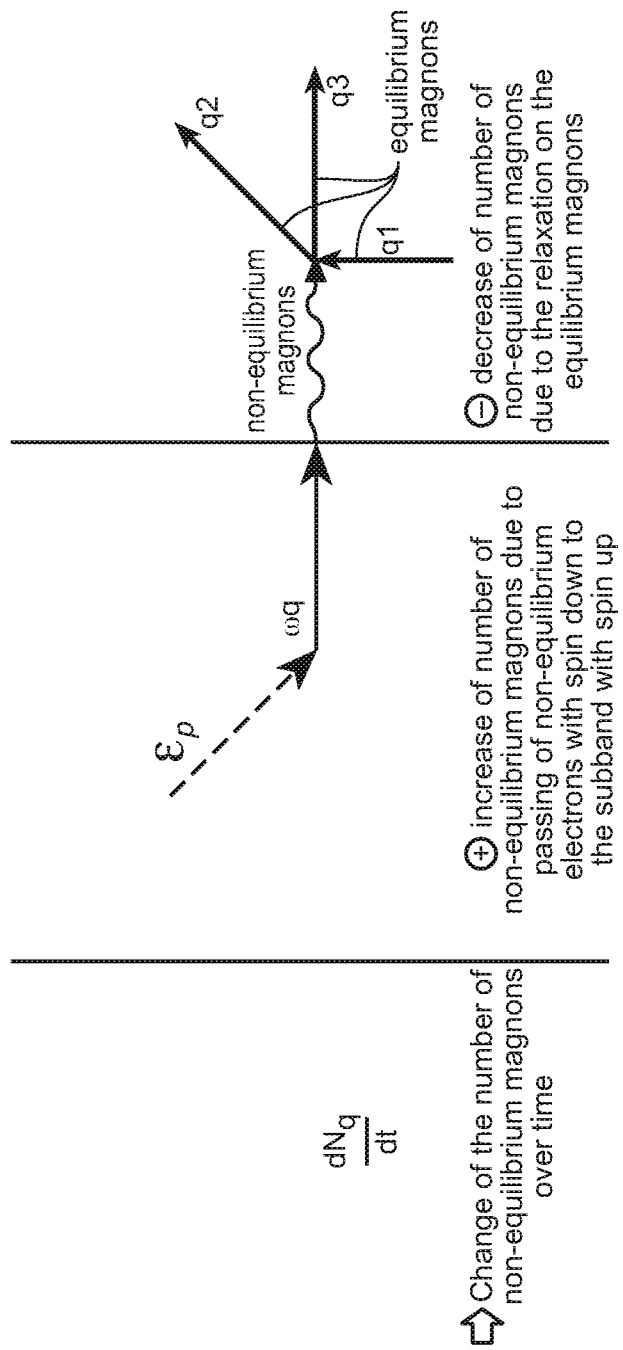
FIG. 8 and FIG. 9 illustrate equations for magnon generation.
Figure 9:
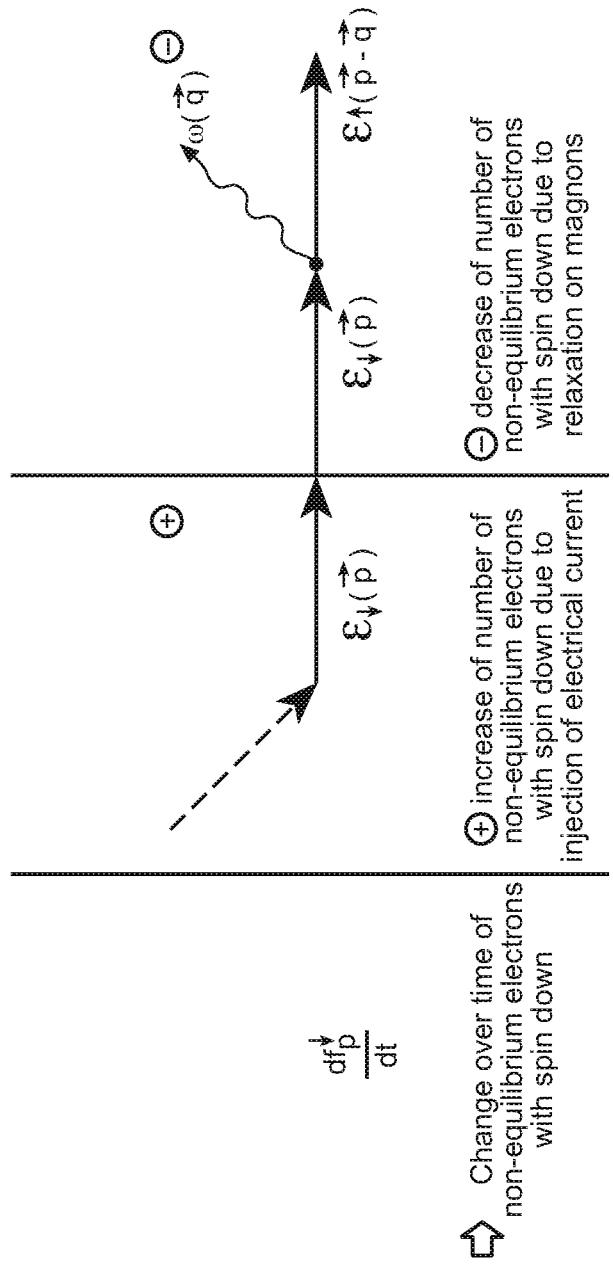

FIGS. 8 and 9 illustrate these equations in general non-steady case.

Here $\Gamma_e(\vec{q})]$ is the rate of relaxation of magnons in collisions with electrons $$\Gamma_e(\vec{q})=4\,\pi\hbar^{-1}I^2 S\,v_0\!\int\!d^3p(2\pi\hbar)^{-3}\delta(\gamma_\uparrow(\vec{p}-\hbar\vec{q})|\varepsilon_{\vec{p}\downarrow}-\hbar\omega_{\vec{q}}-\varepsilon_{\vec{p}-\hbar\vec{q},\uparrow})f_\downarrow(\vec{p}), \qquad \text{(Eq. 6)}$$

where $v_0$ is the unit cell volume.

$\gamma_{em}$ is the electron-magnon relaxation rate:

$$\gamma_{em}(\vec{p})=4\,\pi\hbar^{-1}I^2 S\,v_0\!\int\!d^3q(2\pi\hbar)^{-3}\delta(\gamma_\uparrow(\vec{p}-\hbar\vec{q})|\varepsilon_{\vec{p}\downarrow}-\hbar\omega_{\vec{q}}-\varepsilon_{\vec{p}-\hbar\vec{q},\uparrow})(1+N(\vec{q})), \qquad \text{(Eq. 7)}$$

The "smeared" $\delta$-function, $\delta(\gamma|\varepsilon)$, considers the finite lifetime of the electrons in the final state, caused by the interaction with optical phonons, which may be strong in ferromagnetic semiconductors, with an essential ionicity contribution to the chemical bonds. In an aspect, $$\delta(\gamma\mid\varepsilon)=\frac{1}{\pi}\frac{\hbar\gamma}{(\varepsilon^2+\hbar^2\gamma^2)} \qquad \text{(Eq. 8)}$$

The rate $\gamma_\uparrow(p, \varepsilon_p)$ is the known electron damping rate due to the emission of longitudinal optical phonons in the case of ferromagnetic semiconductors (or scattering on equilibrium electrons with Fermi energy in the case of half-metals). For electrons with energy $\varepsilon_p$ close to $\Delta$, this rate is estimated as $$\gamma_8(\varepsilon_p)=(\pi/2)\alpha\Omega(\Omega/\Delta)^{1/2}\ln(4\Delta/\Omega)\ll\Delta. \qquad \text{(Eq. 9)}$$

Here $\Omega$ is the energy of an optical phonon, and a is the strength of the electron-phonon interaction.

The function $g(\varepsilon)$ is the generation function of electrons, with spin down. We shall treat it as a $\delta$-function $$g(\varepsilon_p)=g_0\varepsilon\delta(\varepsilon-\varepsilon_p). \qquad \text{(Eq. 10)}$$

We suppose in what follows that the energy $\varepsilon$ is small, $\varepsilon \ll \Delta$.

The second term in the l.h.s. in the first of Eq. 5 describes the relaxation of non-equilibrium magnons in collisions with equilibrium ones, under the assumption that $N(\vec{q})$, is close to its equilibrium value, $$N^{(0)}(\vec{q})=[e^{(\hbar\omega_q/kT)}-1]^{-1}. \qquad \text{(Eq. 11)}$$

$\Gamma_m(\vec{q})$ is the magnon-magnon relaxation rate. From Eq. 5 the following integral equation for $N(\vec{q})$ can be obtained, $$N(\vec{q})=(N^0(\vec{q})+\Gamma_e(\vec{q})/\Gamma_m(\vec{q}))(1-\Gamma_e(\vec{q})/\Gamma_m(\vec{q}))^{-1}, \qquad \text{(Eq. 12)}$$

where $$\Gamma_e(\vec{q})=g_0\varepsilon\!\int\!d^3p\delta(\gamma_\uparrow(\vec{p}-\hbar\vec{q})|\varepsilon_{\vec{p}\downarrow}-\hbar\omega_{\vec{q}}-\varepsilon_{\vec{p}-\hbar\vec{q},\uparrow})\delta(\varepsilon-\varepsilon_p)Z^{-1}(\vec{p}), \qquad \text{(Eq. 13)}$$

and $$Z(\vec{p})=\!\int\!d^3q\delta(\gamma_\uparrow(\vec{p}-\hbar\vec{q})|\varepsilon_{\vec{p}\downarrow}-\hbar\omega_{\vec{q}}-\varepsilon_{\vec{p}-\hbar\vec{q},\uparrow})(1+N(\vec{q})). \qquad \text{(Eq. 14)}$$

Eq. 12 is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eq. 6 and Eq. 7 is in its turn determined not only by the pump $g(E_p)$ but also by a certain average (Eq. 14) over the magnon distribution function. The behavior of $N(\vec{q})$ is therefore different from that in the case of parametric pumping.

In an embodiment, $N(\vec{q})$ can be associated with strong pumping.

In another embodiment, the generated non-equilibrium magnons are isotropic.

In certain embodiments, the magnon and electron spectra are isotropic. Then $\Gamma_e$ (q) and $\Gamma_m$ (q) do not depend on the direction of $\vec{q}$.

The relaxation rate $\Gamma(q)$ is usually a power function of q, and it can be written as $$\Gamma_m(q)=\Gamma_m(p_0)(\hbar q/p_0)^t. \quad \text{(Eq. 15)}$$

More specifically, if $\Gamma_m$ (q) is determined by magnon-magnon exchange scattering, then t=4 for magnons, with energy $\hbar\omega(q_0)$ larger than kT, and
t=3 for magnons, with energy $\hbar\omega(q_0)$ smaller than kT.

The strong pumping regime sets in, when $g_0$ exceeds a critical value $G_c$. If the damping of electrons by optical phonons is less than $(\epsilon\Delta)^{1/2}$, this critical value is estimated as $$G_c=2g_c/(t+1),$$

$$g_c=(\Delta/\epsilon)^{3/2}\Gamma_m(q_0)[1+N^{(0)}(q_0)]. \quad \text{(Eq. 16)}$$

At $g_0>G_c$ the function N(q) increases exponentially with pumping $$N(q)=[1+N^{(0)}(q_0)](p_0/2p_\epsilon(t+1))\exp(g_0/G_c), \quad \text{(Eq. 17)}$$

if q falls into the smooth region $$p_0-p_\epsilon \leq \hbar q \leq p_0-p_\epsilon+\delta\hbar q,$$

$$\delta\hbar q=2p_\epsilon \exp(-g_0/G_c), \quad \text{(Eq. 18)}$$

while N(q) with wave vectors outside of the above range does not depend on the pump.

Thus, under sufficiently strong pumping the magnon distribution function has a sharp peak at $\hbar q=.p_0-p_\epsilon$.

In an embodiment, the number of electrons, $\beta$, pumped per second per unit cell can be defined as:

$$\beta=v_0(2\pi\hbar)^{-3}\int d^3p\, g(\epsilon_p). \quad \text{(Eq. 19)}$$

One gets for the pumping estimation by Eq. (10)

$$\beta=(v_0\epsilon^{3/2}m^{3/2}g_0/2^{1/2}\pi^2\hbar^3) \quad \text{(Eq. 20)}$$

and the critical pumping $\beta_c$, with $g_0=G_c$ is $$\beta_c=(v_0q^3_0/(2(t+1)\pi^2))\Gamma_m(q_0)[1+N^{(0)}(q_0)]. \quad \text{(Eq. 21)}$$

In an embodiment where high-frequency magnons are desired, their relaxation can be mainly due to four-magnon exchange interaction. Using the expressions for $\Gamma_m$ published in the following reference (V. G. Vaks, A. I. Larkin and S. A. Pikin, JETP 53 (1967)), $T/T_C.0.2$ can be estimated, and $\hbar\omega(q_0)>kT$, $N^{(0)}(q_0)\ll 1:\Gamma_m$. $10^8-10^9$ sec$^{-1}$.

Thus, it follows from (Eq. 21) the estimate $\beta_c$. $10^5-10^7$ sec$^{-1}$, and it can be determined that $N^{(0)}(q_0)$ is small.

To get a sense of these estimates, consider a model, in which the spin-down electrons are emitted into their active region across the surface area 1 cm$^2$. The lattice constant a of EuO is approximately $5\times 10^{-8}$ cm, i. e. the unit cell volume is approximately $v_0$. $10^{-22}$ cm$^3$. The critical value $N_e \cdot \beta_c \times v_0 \cdot 10^{28}-10^{29}$ cm$^{-3}$ sec$^{-1}$. This is the number of electrons, which should cross the edge in one second to achieve the critical number of emitted magnons in a volume of 1 cm$^3$. However, electrons will emit magnons at a short distance from the edge, which can be estimated in the following way.

The electron-magnon frequency $\gamma_{em}$ is of order $3\times 10^{12}-10^{13}$ sec$^{-1}$. The velocity of electrons with energy of order of $10^{-2}\Delta$ is $5\times 10^6-10^7$ cm×sec$^{-1}$. This gives the mean free path of electrons with respect to magnon emission as: $1\cdot 10^{-6}$ cm. Thus, all electrons entering a sample (including a magnon gain medium) across a selected side will emit magnons at this distance from that side. Therefore, only the region of width l is active, and we get for the current density $j=N_e\times 1$ electrons/sec×cm$^2$. The charge of an electron is $1.6\times 10^{-19}$ Q. Considering that $1\times$Q/sec=1A, we finally get: $j=10^4-10^5$A/cm$^2$. Current densities of order $10^5-10^6$A/cm$^2$ are easy to achieve in semiconductors (or half-metals). In a pulse regime one can obtain current densities j as high as: $j=10^9$A/cm.

The physical meaning of the critical pumping $G_c$ can be understood as follows. The ratio $\Gamma_e/\Gamma_m$ of the rate of generation of the magnons to the rate of their relaxation reaches its maximum value at $\hbar q=p_0!p_\epsilon$ and has its minimum at $\hbar q=p_{0\pm}p_\epsilon$, i.e. there is an excess generation on the left end of the interval in comparison with the right end. Stimulated emission causes the increase of this asymmetry. Nonlinear generation begins when the difference between the number of non-equilibrium magnons at the ends of the generation interval becomes equal to the number of equilibrium magnons, if $N^{(0)}>1$. On the other hand, nonlinear generation begins when the difference between the number of non-equilibrium magnons at the ends of the generation interval becomes equal to 1, if the opposite inequality ($N^{(0)}<1$) holds.

If the electron damping due to optical phonon scattering is large, $\hbar\gamma_\uparrow \gg (\epsilon\Delta)^{1/2}$, the critical pumping, $G'_c$ is smaller than gc is estimated by (Eq. 16)

$$G'_c=\pi g_c \gamma_\uparrow/\Delta. \quad \text{(Eq. 22)}$$

The function N (q) in the critical region increases as $g_0^2$ and the wave-vector interval of generated magnons decreases as $1/g_0$:

$$N(q)=[1+N^{(0)}(q)](g_0/GN_c)^2. \quad \text{(Eq. 23)}$$

One should stress that only the main generation regimes are considered herein. More details can be found in the following reference: I. Ya. Korenblit and B. G. Tankhilevich, Soy. Phys.—JETP, 46, 1167 (1977).

In an embodiment, effect of anisotropy and/or instability of the magnon system can be determined.

If the ratio of the generation rate $\Gamma_e$ ($\vec{q}$) to the relaxation rate $\Gamma_m$ ($\vec{q}$) depends on the direction of the wave vector $\vec{q}$, then in the nonlinear regime the stimulated emission of magnons results in the strong anisotropy of magnon distribution function. As an example, one can consider the anisotropy of $\Gamma_e$ ($\vec{q}$)/$\Gamma_m(\vec{q})$ caused by the anisotropy of the magnon spectrum. The spectrum of magnons with q close to $p_0/\hbar$ can be written as $$\omega_q=Dq^2(1+\Lambda \sin^2\theta), \quad \text{(Eq. 24)}$$

where $$\Lambda=2\ \pi g\Phi_B M_s/\omega_{p0}\ll 1, \quad \text{(Eq. 25)}$$

$M_s$ is the magnetization, $\theta_{\vec{q}}$ is the angle between the vectors $\vec{q}$ and $\vec{M}_S$. If the inequality $\hbar\omega(q_0)<kT$ holds, then the anisotropy of $\Gamma_e$ ($\vec{q}$)/$\Gamma_m(\vec{q})$ implies that the generation is the largest at some angle $\theta$.

Consider the situation, when the damping is large, i.e. $\hbar\gamma_\uparrow \gg (\epsilon\Delta)^{1/2}$. Since the anisotropy is small ($\Lambda \ll 1$), the anisotropy becomes effective only at sufficiently strong pumping, larger than the critical one, Eq. (18). At $g=G_c$ estimated by this equation, the number of magnons starts to increase as in the isotropic case. If one assumes that the basic equations (Eq. 5) describing the generation of magnons close to equilibrium, are valid also beyond the critical pumping, one can reveal the role of small anisotropy.

As shown in the following reference: I. Ya. Korenblit and B. G. Tankhilevich, Soy. Phys.—JETP, 46, 1167 (1977), the maximum generation takes place for magnons with θ close to zero and q close to $p_0$. If the pumping reaches the critical value g*

$$g^* = \pi^2 \hbar \gamma_\uparrow g_c / 2\Lambda^{1/2} \Delta, \quad \text{(Eq. 26)}$$

the function $N(\vec{q})$ becomes $$N(\vec{q}) = N^{(0)}(\vec{q}) \left[ 1 + \Lambda \sin^2(\theta) - \frac{\hbar^2 \gamma_\uparrow^2}{((\Delta - \varepsilon_q)^4 + \hbar^2 \gamma_\uparrow^2)} \left( \frac{p_0}{\hbar q} \right)^2 \right]^{-1} \quad \text{(Eq. 27)}$$

where $E_q = \hbar^2 q^2 / 2m$.

We get at $\hbar q = p_0$, i.e. at $\varepsilon_q = \Delta$ $$N(\vec{q}) = N^{(0)}(\vec{q}) / \Lambda \sin^2(\theta_{\vec{q}}) \quad \text{(Eq. 28)}$$

At θ=0 the denominator of this expression goes to zero. The steady solution of Eqs. (1) exists only at pumping levels below g*. When the pumping level reaches the critical value g*, an avalanche-type growth of the number of magnons occurs, whereas the wave vectors of these non-equilibrium anisotropic magnons are directed along the magnetization and are equal to $p_0$.

Note, that at sufficiently low temperatures the three-magnon dipole scattering may be more important than the discussed above four-magnon exchange scattering. However, the three-magnon scattering probability, as opposed to the four-magnon exchange scattering probability, is a highly anisotropic one and is proportional to $\sin^2\theta \cos^2\theta$. If this is the case, one should expect an instability of magnons with θ=0 and θ=π/2.

In an embodiment, THz radiation can be generated.

The interaction of magnons with electromagnetic radiation was considered in the following reference: M. I. Kaganov and V. M. Tsukernik, Sov. Phys.—JETP 37, 587 (1960). Merging of two magnons with wave vectors q and q' generates a photon with wave vector $$\vec{k} = \vec{q} + \vec{q}' \quad \text{(Eq. 29)}$$

and with frequency $v_k$ equal to $$\omega_q + \omega_{q'} = v_k = ck, \quad \text{(Eq. 30)}$$

where c is the light velocity.

It follows from these conservation laws that k is much smaller than q, i.e. $\vec{q} = -\vec{q}'$.

Using the results of the same reference: M. I. Kaganov and V. M. Tsukernik, Soy. Phys.—JETP 37, 587 (1960), one can derive the rate of the change of the photon distribution function, n(v) in the following way:

$$dn(v)/dt = \quad \text{(Eq. 31)}$$
$$W \int d\theta \cdot \sin^5\theta [N^2(v/2, \theta) \cdot (n(v) + 1) - n(v)(N(v/2, \theta) + 1)^2] - \frac{n(v) - n^{(0)}(v)}{\tau_{ph}},$$

Here $$W = \frac{\mu^2 q_0^3}{2\hbar} \cdot \left( \frac{4\pi g \mu M_s}{\hbar v} \right)^2, \quad \text{(Eq. 32)}$$

where Φ is the Bohr magneton. The last term in the (Eq. 62) describes the relaxation of generated photons, and $\tau_{ph}$ is the photon relaxation time.

For EuO, with $q_0 = 2.6 \times 10$ cm$^{-1}$, $\hbar v = 1.5$ meV, and $4\pi M_S = 24 \times 10^3$ Gs, one obtains W·$2 \times 10^7$ sec$^{-1}$.

If the magnon distribution function is isotropic, one can perform the integration in (Eq. 31) and one gets the following equation:

$$dn(v)/dt = \quad \text{(Eq. 33)}$$
$$(16/15) \cdot W \cdot [N^2(v/2) - 2n(v) \cdot N(v/2) - n(v)] - \frac{n(v) - n^{(0)}(v)}{\tau_{ph}}.$$

By analyzing this equation, it is clear that at the initial stage of generation, when n is smaller than N, the number of photons increases as $N^2$, provided the photon relaxation is sufficiently small. With the increase of n, the negative terms in (Eq. 33) become significant, and the photons reach a steady state, with dn/dt=0. If this is the case, we have the following expression for the number of photons n at the steady state:

$$n = \frac{n^{(0)} + w\tau_{ph} N^2}{1 + (2N+1)w\tau_{ph}}, \quad \text{(Eq. 34)}$$

where w=16 W/15.

If $w\tau_{ph}$ is large, $w\tau_{ph} \gg 1/N$, the number of photons is as follows:

$$n = \frac{N^2}{2N+1} \approx \frac{N}{2}. \quad \text{(Eq. 35)}$$

If, on the other hand, $1/N^2 \ll w\tau_{ph} \ll 1/N$, the number of photons is as follows:

$$n = w\tau_{ph} N^2, 1 \ll n \ll N. \quad \text{(Eq. 36)}$$

Finally, if the relaxation of photons is very fast, $w\tau_{ph} N^2 \ll 1$, the pumping is inefficient, and $$n \approx n^{(0)}. \quad \text{(Eq. 37)}$$

In an embodiment, frequency of the THz radiation in $Co_2MnSi$ (001)/MgO heterostructures can be estimated.

In an aspect, relevant parameters can be estimated.

For example, stiffness D=466 meV(Å)$^2$ can be estimated according to Ritchie L. et al., Phys. Rev. B 68, 104430. Or 567 meV(Å)$^2$ according to Jan Thoene, Stanislav Chadov, Gerhard Fecher, Claudia Felser, Jurgen Kubler) J. Phys. D: Appl. Phys. 42 (2009) 084013);

In another embodiment, an energy gap, e.g., Δ=0.6 eV, can be determined according to Bjorn Hulsen and Matthias Scheffler; Phys. Rev Let. 103, 046802 (2009).

In yet another embodiment, an effective electron mass $m_{eff}$=(1.15-1.67) $m_0$ can be estimated according to Steffen Kaltenborn and Hans Christian Schneider, Phys. Rev B 88, 045124 (23013); D. Y. Smith, B. Segall, Phys. Rev. B 34, 5191 (1986). Thus, for the frequency of THz radiation is double of min frequency of Spin Wave (at magnon lazing point)

$$\hbar F_{THz} = 2D(q_1)^2$$

For D=466 meV(Å)$^2$ $$F = \hbar F_{THz} = 2 \times 466 \text{ meV(Å)}^2 (5.5^2 - 6.2^2) 10^{14} \text{ cm}^{-2} = 2 \times 466(30.25 - 38.44)$$

For D=567 meV(Å)²

$$F = (13.10 - 20.24) \text{ THz}$$

In an embodiment, the timing of generation of such coherent terahertz radiation can be on the order of $10^{-7}$ sec. This means that this THz radiation can be modulated only up to 10 MHz (e.g., one can modulate the radiation only after it is created). This limitation can be overcome by introducing the storage cavity 630 with dimensions of L2 enclosing the containment cavity 620 with dimensions of L1: $L_2 < L_1$.

In an aspect, radiation penetrated into the storage cavity 630 from the containment cavity 620 via the hole D1 can be modulated at any modulation frequency $f_{modulation}$ that is less than the generated terahertz frequency: $f_{THz}$: $f_{modulation} < f_{THz}$.

For practical purposes, if the radiation frequency is 10 THz, the modulation frequency can be as high as 1 THz.

The radiation from the storage cavity 630 can be outputted via the outside hole D2 with dimension satisfying the flowing condition:

$$\lambda_{THz} \ll D2 \ll L2. \quad \text{(Eq. 38)}$$

Specific materials can be employed for different layers. In an embodiment, the substrate 602 can comprises: aluminum oxide ($Al_2O_3$), indium-tin-oxide (InTnO); silicon (Si); silicone on sapphire (SoS); or magnesium oxide (MgO).

In another embodiment, the bottom electrode 604 can comprises: cobalt iron alloy ($Co_{0.5}Fe_{0.5}$); silver (Ag); gold (Au); platinum (Pt); cobalt (Co); palladium (Pd); titanium (Ti); or titanium tungsten (TiW).

In another embodiment, the Manon Gain Medium) 606 can comprise chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$ (CMS); or Heusler alloy $Co_2FeAl_{0.5}Si_{0.5}$ (CFAS).

For example, $Co_2MnSi$ can be used as a material to implement the Magnon Gain Medium 606. Indeed, in the paper published recently in Nat Commun., 2014 May 30; 5: 3974. "Direct observation of half-metallicity in the Heusler compound Co2MnSi" by M. Jourdan et al., $Co_2MnSi$ samples were prepared and investigated completely in situ in an ultrahigh vacuum cluster consisting of sputtering chambers, an molecular beam epitaxy (MBE) chamber, and a Synchrotron radiation ultraviolet photoemission spectroscopy (SRUPS) chamber equipped with a He gas discharge lamp (hν=21.2 eV) and a hemispherical energy analyzer with multi-channel spin filter (energy resolution≅400 meV, Sherman function S=0.42±0.05). First, an epitaxial buffer layer of the Heusler compound Co2MnGa (30 nm) was grown on the MgO(100) substrate by radio frequency (RF)-sputtering at room temperature. By an optimized additional annealing process at 550° C. L21 order was obtained as shown by high energy electron diffraction (RHEED) and X-ray diffraction (XRD). Co2MnSi (70 nm) was RF-sputtered on top at room temperature. Induced by the buffer layer the Co2MnSi thin films showed already some degree of $L2_1$ surface order as deposited. By additional annealing the order was improved as was demonstrated for the film surface by RHEED.

In another example, a material that can be used as the Magnon Gain Medium 606 can be Co2+x Fe1−x Si Heusler alloy in $L2_1$ phase. Please, see "Co Fe Si/MgO(001) Heusler alloys: Influence of off-stoichiometry and lattice distortion on the magnetic properties in bulk and on MgO(001)", published in the Journal of Applied Physics 109, 07E128 (2011); by H. C. Herper et al.

In another embodiment, the tunnel junction 608 can comprise magnesium oxide (MgO); aluminum oxide ($Al_2O_3$); or spinel $MgAl_2O_4$.

In the paper "MgAl O(001) based magnetic tunnel junctions made by direct sputtering of a sintered spinel target"; published in Appl. Phys. Lett. 108, 132404 (2016); by Mohamed Belmoubarik, Hiroaki Sukegawa, Tadakatsu Ohkubo, Seiji Mitani, and Kazuhiro Hono, a fabrication process of an epitaxial MgAl O barrier for magnetic tunnel junctions (MTJs) was developed by using a direct sputtering method from an MgAl O spinel sintered target.

Annealing the sputter-deposited MgAl O layer sandwiched between Fe electrodes led to the formation of a (001) oriented cation-disorder spinel with atomically sharp interfaces and lattice-matching with the Fe electrodes. A large tunnel magnetoresistance ratio up to 245% at 297 K (436% at 3 K) was achieved in the Fe/MgAl O/Fe (001) MTJ as well as an excellent bias voltage dependence. These results indicate that the direct sputtering is an alternative method for the realization of high performance MTJs with a spinel-based tunnel barrier.

The spin injector 610 can be selected from the group of materials consisting of chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$; and Heusler alloy $Co_2FeAl_{0.5}Si_{0.5}$ (CFAS).

For example, in the paper "Structural and magnetic properties and tunnel magnetoresistance for $Co_2(Cr,Fe)Al$ and $Co_2FeSi$ full-Heusler alloys" by K Inomata et al., published in Journal of Physics D: Applied Physics, Volume 39, Number 5, the structure and magnetization of $Co_2(Cr_{1-x}Fe_x)Al$ ($0 \leq x \leq 1$) and $Co_2FeSi$ full-Heusler alloy have been investigated. The films were deposited on thermally oxidized Si ($SiO_2$) and MgO (001) single crystal substrates by ultra-high vacuum sputtering at various temperatures. The films were also post-annealed after deposition at room temperature (RT). Magnetic tunnel junctions with a full-Huesler alloy electrode were fabricated with a stacking structure of $Co_2YZ$ (20 nm)/Al (1.2 nm)-oxide/$Co_{75}Fe_{25}$ (3 nm)/IrMn (15 nm)/Ta (60 nm) and microfabricated using electron beam lithography and Ar ion etching with a $10^2$ μm² junction area, where $Co_2YZ$ stands for $Co_2(Cr_{1-x}Fe_x)Al$ or $Co_2FeSi$. The tunnel barriers were formed by the deposition of 1.2 nm Al, followed by plasma oxidization in the chamber. The x-ray diffraction revealed the A2 or B2 structure depending on heat treatment conditions and the substrate, but not $L2_1$ structure for the $Co_2(Cr_{1-x}Fe_x)Al$ ($0 \leq x \leq 1$) films. The $L2_1$ structure, however, was obtained for the $Co_2FeSi$ films when deposited on a MgO (001) substrate at elevated temperatures above 473 K. The maximum tunneling magnetoresistance (TMR) was obtained with 52% at Room Temperature (RT) and 83% at 5 K for a junction using a $Co_2(Cr_{0.4}Fe_{0.6})Al$ electrode. While the junction using a $Co_2FeSi$ electrode with the $L2_1$ structure exhibited the TMR of 41% at RT and 60% at 5 K, which may be improved by using a buffer layer for reducing the lattice misfit between the $Co_2FeSi$ and MgO (001) substrate.

The pinning layer 612 can be selected from the group of materials consisting of iridium manganese chromium (IrMnCr); iridium manganese (IrMn); nickel manganese (NiMn); nickel manganese chromium (NiMnCr); nickel manganese iron (NiMnFe); nickel manganese iridium (NiMnIr); nickel manganese palladium (NiMnPd); nickel manganese platinum (NiMnPt); nickel manganese rhodium (NiMnRh); platinum-manganese (PtMn), and nickel manganese ruthenium (NiMnRu).

In an embodiment, the pinning layer 612 can further comprise a Ruderman-Kittel-Kasuya-Yosida non-magnetic pinning layer.

For example, as it is illustrated in FIG. 2, the RKKY interaction exhibits the antiferromagnetic polarity for a Ruthenium spacer having the layer thickness at about 8 Å. (Please see above).

In another example of a spacer that utilizes the RKKY interaction and exhibits the antiferromagnetic polarity is a Cu spacer. In an embodiment, the Cu spacer can correspond to a Cu spacer described in "Current-in-Plane Giant Magnetoresistance Sensor Using a Thin Cu Spacer and Dual Nano-Oxide Layers With a DR Greater Than 20 Ohms/sq"; published in IEEE Transactions on Magnetics, Volume: 43 Issue: 2 by Michael A. Seigler et al.

The reference layer 614 can comprise a ferromagnetic material that is used to select the orientation of the Magnon Gain Medium 606 in a certain direction.

The reference layer 614 can be, for example, a free layer. The reference layer 614 can be implemented by using CFA (B2-ordered Co2FeAl).

For example, the reference layer 614 can correspond to a reference layer described by Hiroaki Sukegawa, Zhenchao Wen, Kouta Kondou, Shinya Kasai, Seiji Mitani, and Koichiro Inomata; Applied Physics Letters 100, 182403 (2012); "Spin-transfer switching in full-Heusler Co2FeAl-based magnetic tunnel junctions".

In another example, the reference layer 614 can be a perpendicularly magnetized [Co/Pd]-based reference layer and an in-plane magnetized CoFeB sensing layer with various thicknesses (tCoFeB). Linear TMR curves to an out of-plane magnetic field were successfully obtained with a dynamic range of more than 600 Oe, corresponding to the coercivity of the [Co/Pd]-based reference layer. The MTJs showed the highest sensitivity of 0.026%/Oe for tCoFeB=1.8 nm and the smallest nonlinearity of 0.11% full scale for t=3 nm. The sensitivity and the nonlinearity in the MTJs were significantly associated with t, which is attributed to the change in the anisotropy field of the CoFeB sensing layer. Please, see "Magnetic Tunnel Junctions With [Co/Pd]-Based Reference Layer and CoFeB Sensing Layer for Magnetic Sensor" Published in IEEE Transactions on Magnetics (Volume: 52, Issue: 7, July 2016) by Takafumi Nakano et al.

The top electrode 616 can be selected from the group of materials consisting of cobalt iron alloy (Co0.5 Fe 0.5); silver (Ag); gold (Au); platinum (Pt); cobalt (Co); palladium (Pd); titanium (Ti); and titanium tungsten (TiW). Each of these materials can be deposited by either MBE or sputtering.

Thus, the terahertz magnon laser 600 generates terahertz radiation based on magnon laser effect. For the reference, please see U.S. Pat. Nos. 7,430,074; 7,508,578; 9,136,665. In an embodiment, frequency of generated coherent terahertz radiation can be tuned by varying the bias voltage 618. In another embodiment, the containment cavity 620 can be employed to output tunable coherent terahertz radiation into the storage cavity 630. Additionally or alternatively, the storage cavity 630 can be employed to output tunable coherent terahertz radiation. The tunable coherent terahertz radiation can be modulated by modulating the bias voltage 618 with modulating frequency. In another embodiment, the tunable coherent terahertz radiation can be modulated by modulating the output coherent radiation by external means.

In another embodiment, the tunable coherent terahertz radiation can be modulated by modulating the output coherent radiation by using piezo materials to mechanically change the size of the hole D1 and/or the outside hole D2. In yet another embodiment, the tunable coherent terahertz radiation can be modulated by modulating the output coherent radiation by using synthetic ceramics materials. The hole D1 and/or the outside hole D2 can output the coherent terahertz radiation.

In an embodiment, a Coherent Terahertz Magnon laser can be provided for communication applications. A small divergence of a coherent THz laser beam can allow substantial increase in received power.

The spot size $w_z$ of a coherent laser beam is a function of position along the direction of propagation z of the Gaussian beam, and depends on the aperture size d of the transmitting antenna and wavelength λ. The Coherent terahertz laser beam size $w_z$ at the distance z=0 from aperture $w_o$=d is estimated by A. E. Siegman, Lasers (University Science Books 1986)

$$w_z = w_o \sqrt{1+(\lambda z/\pi w_o^2)^2} \quad \text{(Eq. 39)}$$

Figure 10:
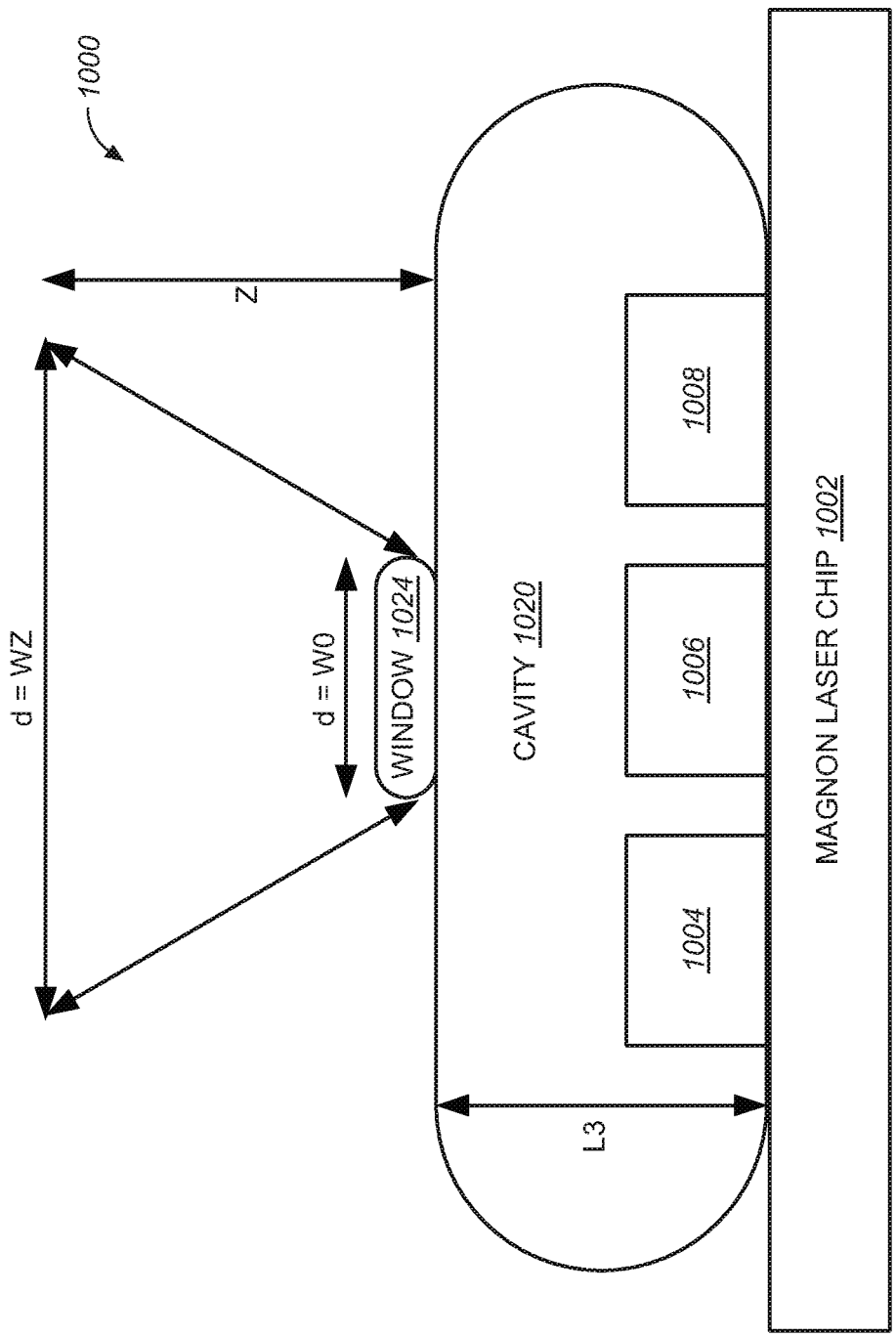
FIG. 10 illustrates another example apparatus according to an aspect of the subject disclosure.

FIG. 10 illustrates an apparatus 1000, in accordance with one or more embodiments described herein. The apparatus 1000 can include a magnon laser chip 1002 with a cavity 1020. The cavity 1020 can include a window 1024 that can be an aperture of the cavity 1020. In certain embodiments, the cavity 1020 can comprise a height L3. As shown in FIG. 10, the size of a coherent THz beam emanating from the window 1024 with the size $w_o$=d=1 mm having λ (10 THz)=3×10$^{-2}$ mm and at a distance z=100 m would be: $w_z$=10$^{-3}$ m √1+(3 10$^{-5}$m 10$^2$m/3.14 10$^{-6}$ m$^2$)$^2$=1 m.

On the other hand, the divergence of the non-coherent THz beam at the distance of 100 m would comprise the sphere surface with radius 100 m. Therefore, by using a coherent beam the link budget is improved by 40 dB. Indeed (R$^2$/$w_z^2$)=100$^2$/1$^2$=10$^4$=40 dB. So, the recipient can use a small antenna to receive such a signal. Thus, the clandestine recipient can receive the short-term clandestine communication on undetectable THz frequency by detecting the THz laser beam spot having size of 1 m at the distance of 100 m from the transmitter. This task can be simplified by transmitting several such coherent laser beams simultaneously.

In an embodiment, the cavity 1020 can be a highly reflective cavity. The cavity 1020 can be made, for example, out of silicon membrane (e.g., See "High-efficiency terahertz-wave generation in silicon membrane waveguides" published in the Proceedings Volume 9199, Terahertz Emitters, Receivers, and Applications V; conference-proceedings-of-SPIE/9199.toc) 91990D (2014) Event: SPIE Optical Engineering+Applications (/conference-proceedings-of-spie/browse/SPIE-Optics-Photonics/SPIE-Optical-Engineering Applications/2014), 2014, San Diego, Calif., United States published by Hongjun Liu et al.

In another embodiment, the window 1024 can be a highly THz and far-infrared transparent window (e.g., aperture) made out of Ge—Ga—Te far-infrared chalcogenide glasses, similar to Ge—Ga—Te far-infrared chalcogenide glasses described in "Novel NaI improved Ge—Ga—Te far-infrared chalcogenide glasses", published in Infrared Physics & Technology; Volume 72, September 2015, Pages 148-152 by Ci Cheng et al.

As shown in FIG. 10, the size of a coherent THz beam emanating from the window 1024 with the size $w_o$=d=1 mm having λ (10 THz)=3×10$^{-2}$ mm and at a distance z=100 m would be: $w_z$=10$^{-3}$ m √1+(3 10$^{-5}$ m 10$^2$m/3.14 10$^{-6}$ m$^2$)$^2$=1 m.

On the other hand, the divergence of the non-coherent THz beam at the distance of 100 m would comprise the sphere surface with radius 100 m. Therefore, by using a coherent beam the link budget is 40 dB better. Indeed $(R^2/w_z^2)=100^2/1^2=10^4=40$ dB. So, the recipient can use a small antenna to receive such a signal. Thus, the clandestine recipient can receive the short-term clandestine communication on undetectable THz frequency by detecting the THz laser beam spot having size of 1 m at the distance of 100 m from the transmitter. This task can be simplified by transmitting several such coherent laser beams simultaneously. For instance, a coherent laser beam 1004, a coherent laser beam 1006, and a coherent laser beam 1008 can be transmitted simultaneously.

In an embodiment, the cavity 1020 can be made out of silicon membrane (See "High-efficiency terahertz-wave generation in silicon membrane waveguides" published in the Proceedings Volume 9199, Terahertz Emitters, Receivers, and Applications V; conference-proceedings-of-SPIE/9199.toc) 91990D (2014).

Event: SPIE Optical Engineering+Applications (/conference-proceedings-of-spie/browse/SPIE-Optics-Photonics/SPIE-Optical-Engineering Applications/2014), 2014, San Diego, Calif., United States published by Hongjun Liu et al.

In an embodiment, the window 1024 can be made out of Ge—Ga—Te far-infrared chalcogenide glasses (See "Novel NaI improved Ge—Ga—Te far-infrared chalcogenide glasses", published in Infrared Physics & Technology; Volume 72, September 2015, Pages 148-152 by Ci Cheng et al.).

Figure 11:
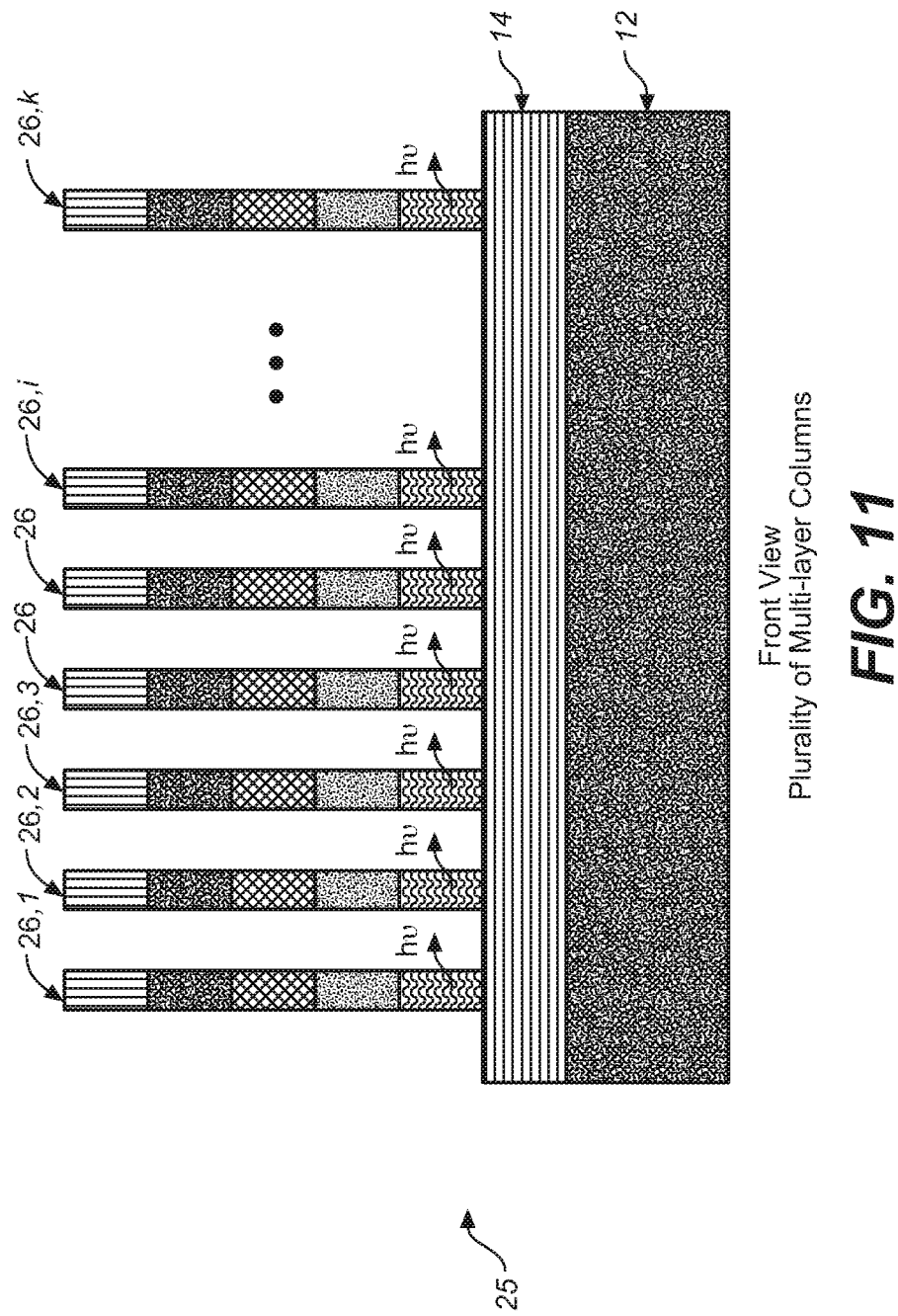
FIG. 11 is a front view of a terahertz generator comprising a plurality of single terahertz magnon lasers, each such single terahertz magnon laser further comprising a single multilayer column, for the purposes of the present technology.

In an embodiment of the present technology, FIG. 11 is a front view of a terahertz generator comprising a plurality of single terahertz magnon lasers, each such single terahertz magnon laser further comprising a single multilayer column {26,1; 26,2; 26,i; . . . 26,k}; wherein i and k are integers. Each such single multilayer column 26,i is coupled with a bottom electrode 14, where the bottom electrode 14 is coupled with a substrate 12.

Figure 12:
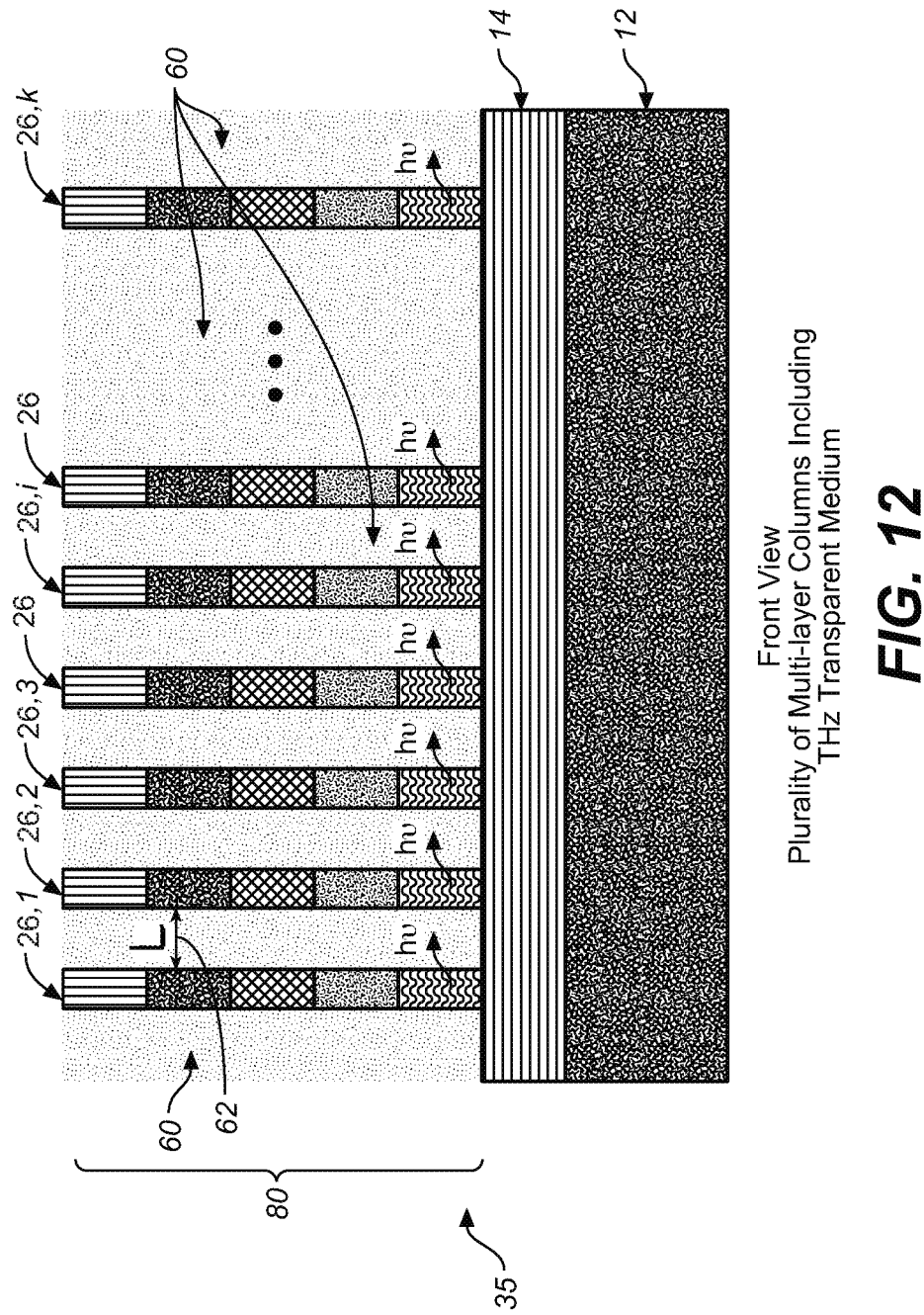
FIG. 12 illustrates a front view of a terahertz generator comprising a plurality of single terahertz magnon lasers, each such single terahertz magnon laser further comprising a single multilayer column, and terahertz transparent medium separating at least two such single multilayer columns for the purposes of the present technology.

In an embodiment of the present technology, FIG. 12 illustrates a front view 35 of a terahertz generator comprising a plurality of single terahertz magnon lasers 10,1; 10,2 . . . 10, i, . . . 10, k; i and k are integers; each such single terahertz magnon laser further comprising a single multilayer column 80, the bottom electrode 14, the substrate 12 and terahertz transparent medium 60 separating at least two such single multilayer columns. A bias voltage (not shown) applied across each single terahertz magnon laser 10, i, from a top layer of the single multilayer column 80 to the bottom electrode 14 is configured to inject the spin current from the spin injector 610 into the Magnon Gain Medium 606. The injected current enables transition of the spin down electron from the spin injector 610 into the sub band with spin down of the Magnon Gain Medium 606 via the tunnel junction 608 which triggers the magnon lazing process by passing into the sub band with spin up of the Magnon Gain Medium 606 that results in generation of terahertz radiation that emanates from the top surface 45 (of FIG. 13) of the device. For the reference, please see U.S. Pat. Nos. 7,430,074; 7,508,578; 9,136,665.

In an embodiment of the present technology, referring still to FIG. 12, a distance L between any two neighboring multilayer columns, (for example, a distance 62 between two neighboring multilayer columns 26, 1 and 26, 2) can be greater than the wavelength $\lambda_{THz}$ of the emanated terahertz signal so that each generated THz photon could be born outside the Magnon Gain Medium area.

$$D > \lambda_{THz} \quad \text{(Eq. 40)}$$

In an embodiment of the present technology, referring to FIG. 12, the terahertz transparent medium 60 is selected from the group of materials consisting of: a crystal terahertz transparent material; and a polymer terahertz transparent material.

In an embodiment of the present technology, referring to FIG. 12, the terahertz transparent medium 60 is selected from the group of crystal materials consisting of High Resistivity Float Zone Silicon (HRTZ-Si); crystal quartz; and sapphire.

The crystals such as silicon, crystal quartz, and sapphire are important for THz optics production. For the reference, please see X.-C. Zhang, J. Xu, Introduction to THz Wave Photonics, Springer Science+ Business Media, LLC 2010.

Besides synthetic diamond high resistivity silicon is the only isotropic crystalline material suitable for the extremely wide range from NIR (1.2 μm) to Millimeter (1000 μm) waves and more. In comparison with diamond it is rather cheaper to grow and machine. Moreover, it may have considerably bigger dimensions that allows manufacturing the elements of fast-developing THz electronics based on that.

One of the best materials for wavelengths beyond 50 μm is z-cut crystal quartz. It is important that z-cut crystal quartz windows are transparent in the visible range allowing easy adjustment with HeNe laser, do not change the state of light polarization, and can be cooled down below the λ-point of liquid helium. Crystal quartz is birefringent material that should be noted if the polarization of radiation is important.

Sapphire like crystalline quartz is transparent in THz region as well as in visible one. For measured samples with thicknesses from 1 to 5 mm transmission lower 600 μm strongly depends on sample thickness. Like HRFZ-Silicon, sapphire also can be used for manufacturing of photoconductive antennas for THz because of similar refractive index value in THz.

In an embodiment of the present technology, referring to FIG. 12, the terahertz transparent medium 60 is selected from the group of polymer materials consisting of: High Density Polyethylene (HDPE); Polymethylpentene (TPX); polyethylene (PE); and polytetrafluoroethylene (PTFE).

Among large variety of available polymers there are some of excellent terahertz transparencies with relatively low reflectivity. The best materials in this sense are TPX (polymethylpentene), polyethylene (PE), polypropylene (PP), and polytetrafluoroethylene (PTFE or Teflon). At longer wavelengths, the transmission of these polymers is structure less and flat. Going to shorter wavelengths, mainly below 200 μm, characteristic bands of intrinsic vibrations appear and scattering due to inhomogeneities increases. Polymers generally become increasingly opaque at shorter wavelengths.

Polymethylpentene (TPX) is the lightest of all known polymers. It is optically transparent in UV, visible, and THz ranges, what for example allows using a HeNe laser beam for alignment. Index of refraction is ~1.46 and is relatively independent on wavelength. Losses are very low up to mm-wavelengths. TPX has excellent heat resistance and is highly resistant to most organic and inorganic commercial chemicals. TPX is a hard solid material which can be mechanically shaped into various optical components like lenses and windows. Also, specifically TPX is used in $CO_2$ laser pumped molecular lasers as output window because it is transparent in the whole terahertz range and totally suppresses the ~10 μm pump radiation. Also, TPX windows are used in cryostats as "cold" windows. The THz transparency of TPX does not change in dependence on temperature. Temperature coefficient of refractive index is $3.0*10^{-4}$ $K^{-1}$ (for the range 8-120 K). In comparison with other materials being used for operating in THz range TPX shows excellent optical properties and for example can be good substitution for Picarin (Tsurupica) lenses. In addition, TPX is cheaper and commercially available in opposite to Picarin.

Polyethylene (PE) is light elastic crystallizing material. It can be heated up to 110° C. and cooled down to −45÷−120° C. depending on grade. PE has good dielectric characteristics, chemical resistance, and radio resistance. Contrariwise, it is unstable to UV-radiation, fats, and oils. PE is biologically inert, is easy to be processed. Density (23° C.) is 0.91-0.925 g/cm3. Tensile flow limit (23° C.) is 8-13 MPa. Modulus of elasticity (23° C.) is 118-350 MPa. Refractive index is ~1.54 and is rather equal within wide wavelength region. Usually high-density polyethylene (HDPE) is used for component's production. Besides quite thick lenses and windows, thin HDPE films are used for THz polarizers. In addition, HDPE is used as the window for Golay cells. THz transmission of HDPE doesn't depend on temperature that allows using HDPE windows in cryostats. Temperature coefficient of refractive index is $6.2*10^{-4}$ $K^{-1}$ (for the range 8-120 K).

Polytetrafluoroethylene (PTFE) is a white solid at room temperature, with a density of about 2.2 g/cm³. Its melting point is 327° C., though its properties remain at a useful level over a wide temperature range of −73° C. to 204° C. Refractive index is ~1.43 within wide wavelength region.

Figure 13:
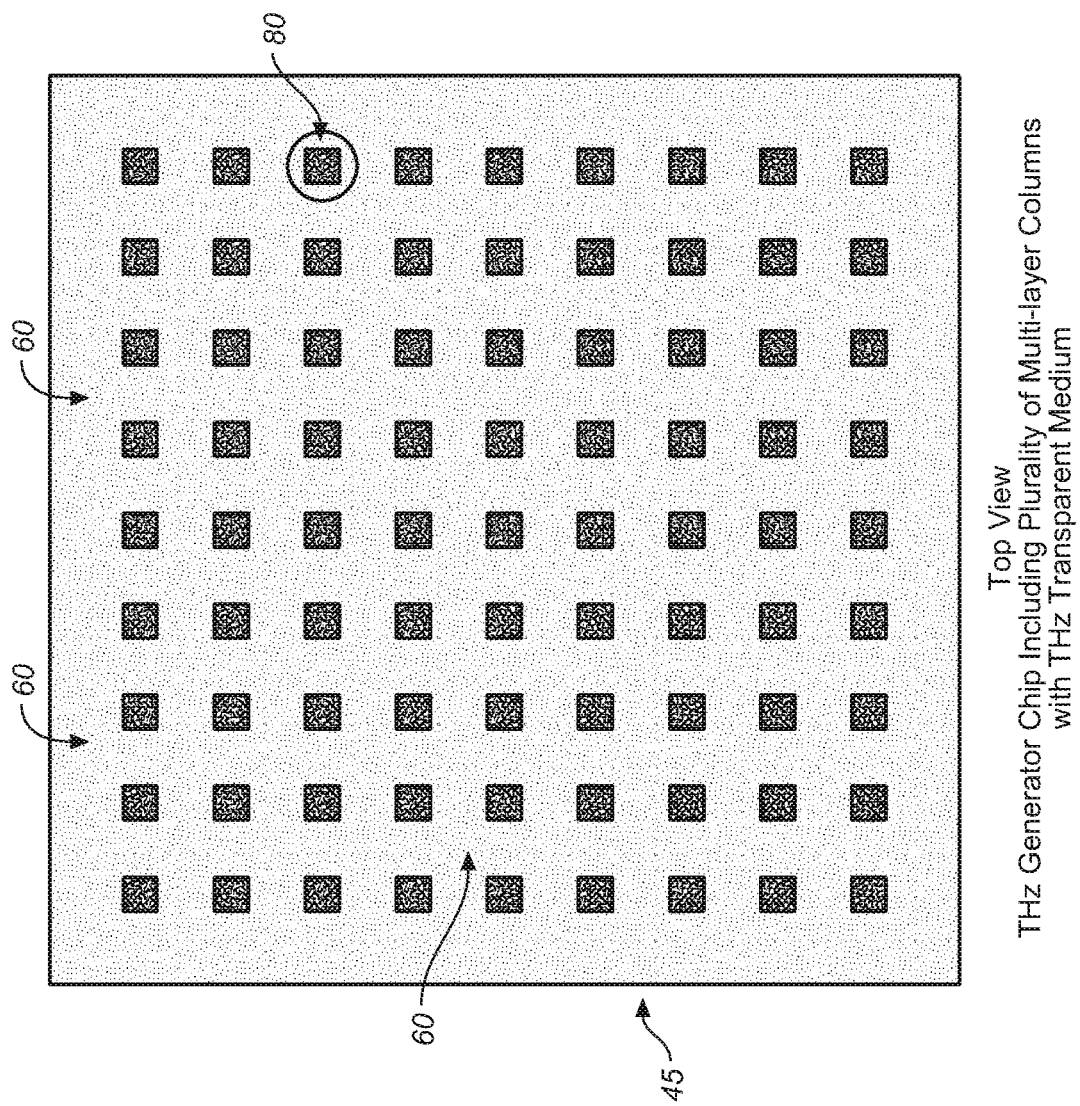
FIG. 13 shows a top view of a terahertz generator comprising a plurality of single terahertz magnon lasers, each such single terahertz magnon laser further comprising a single multilayer column, and terahertz transparent medium filled in between such single multilayer columns for the purposes of the present technology.

In an embodiment of the present technology, FIG. 13 shows a top view of a terahertz generator comprising a plurality of single terahertz magnon lasers, each such single terahertz magnon laser comprising a single multilayer column 80, and a terahertz transparent medium 60 filled in between such single multilayer columns 80.

In an embodiment of the present technology, at least one single terahertz magnon laser 10,i (of FIG. 12) generates terahertz radiation based on magnon laser effect. For the reference, please see U.S. Pat. Nos. 7,430,074; 7,508,578; 9,136,665.

In an embodiment of the present technology, a method for generating a terahertz signal by using the apparatus 25 of FIG. 11 comprising a plurality of terahertz magnon laser generators (10, 1-10, k) and a terahertz transparent medium (60 of FIG. 12) separating at least two such terahertz magnon laser generators is provided. At least one such terahertz magnon laser generator 15 of FIG. 1 comprises: the substrate 12; the bottom electrode 14 coupled to the substrate 12; and the multilayer column 26 coupled to the bottom electrode 14. The multilayer column further comprising the bottom layer 16 further comprising Magnon Gain Medium; the tunnel junction 18 coupled to the bottom layer 16; the spin injector 20 coupled to the tunnel junction 18; the pinning layer 22 coupled to the spin injector 20; and the top electrode 28 coupled to the pinning layer 22. In an embodiment, the spin injector 20 can be a top layer comprising a spin injector.

In an embodiment of the present technology, the method for generating a terahertz signal by using the apparatus 25 of FIG. 11 further comprises: (A) fixing the magnetization of the spin injector 20 in antiparallel orientation relative to the magnetization of the bottom layer 16 comprising the Magnon Gain Medium; and (B) applying voltage across at least one such multilayer column 26 between the top electrode 28 and the bottom electrode 14, where the terahertz radiation signal is configured to propagate via the terahertz transparent medium (60 of FIG. 12).

In an embodiment of the present technology, the method for generating a terahertz signal by using the apparatus 25 of FIG. 11 further comprises: (A1) using the RKKY pinning layer 22 (of FIG. 1); and (A2) selecting the thickness of the RKKY pinning layer to fix the magnetization of the spin injector in antiparallel orientation relative to the magnetization of the bottom layer 16 comprising the Magnon Gain Medium.

Figure 14:
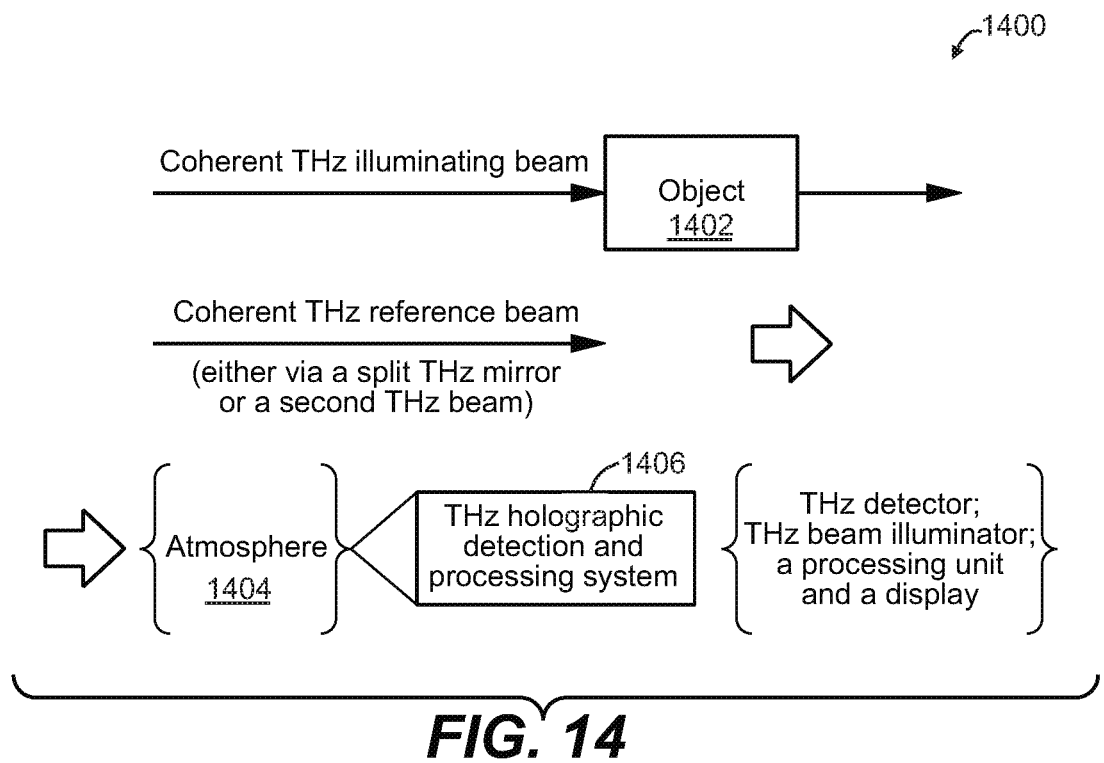
FIG. 14 illustrates the THz coherent communication system configured to form, transmit, receive and read holographic images in THz spectrum for the purposes of the present technology.

In an embodiment of the present technology, the method for generating a terahertz signal by using the apparatus 25 of FIG. 11 further comprises the step (C) of separating each pair of such multilayer columns by a distance L (62 of FIG. 12) greater than the wavelength of the generated terahertz signal. In another embodiment of the present technology, referring to FIG. 14, a THz coherent communication system 1400 can be provided. In certain embodiments, a coherent THz illuminating beam can be provided to an object 1402. In certain embodiments, a coherent THz reference beam can be provided to atmosphere 1404 for a THz holographic detection and processing system 1406. In one embodiment, the coherent THz reference beam can be generated via a split THz mirror. In another embodiment, the coherent THz reference beam can be a second THz beam. The THz holographic detection and processing system 1406 can include, for example, a THz detector, a THz beam illuminator, a processing unit and/or a display. In certain embodiments, a coherent THz illuminating beam can be generated and/or received. The coherent THz illuminating beam can illuminate the object 1402. Furthermore, a coherent THz reference beam can be generated and/or received. The two received THz coherent beams (e.g., the coherent THz illuminating beam and the coherent THz reference beam) can be combined to form a holographic image of the object 1402. The holographic image of the object 1402 can be illuminated, for example, by a THz reading beam configured to read the holographic image of the object 1402. Additionally, the holographic image of the object 1402 can be displayed on a computer-readable display of the THz holographic detection and processing system 1406. In certain embodiments, frequency of a coherent terahertz magnon laser can be tuned to enable propagation of the coherent THz laser beam via a propagation window of the atmosphere 1404. In certain embodiments, the THz holographic image can be recorded on a THz multilayer material.

(The following discussion is taken from Wikipedia): "Temporal coherence is the measure of the average correlation between the value of a wave and itself delayed by T, at any pair of times. Temporal coherence tells us how monochromatic a source is. In other words, it characterizes how well a wave can interfere with itself at a different time. The delay over which the phase or amplitude wanders by a significant amount (and hence the correlation decreases by significant amount) is defined as the coherence time $\tau_c$. At a delay of $\tau=0$ the degree of coherence is perfect, whereas it drops significantly as the delay passes $\tau=\tau_c$. The coherence length $L_c$ is defined as the distance the wave travels in time $\tau_c$."

One should be careful not to confuse the coherence time with the time duration of the signal, nor the coherence length with the coherence area.

The terahertz magnon laser system utilizing the temporal coherence properties comprises a single terahertz magnon laser and a terahertz receiver, and a processing unit.

It can be shown that the larger the range of frequencies $\Delta f$ a wave contains, the faster the wave decorrelates (and hence the smaller $\tau_c$ is). Thus, there is a tradeoff:

$$\tau_c \Delta f \lesssim 1 \qquad \text{(Eq. 41)}$$

Formally, this follows from the convolution theorem in mathematics, which relates the Fourier transform of the power spectrum (the intensity of each frequency) to its autocorrelation Examples of temporal coherence. We consider four examples of temporal coherence.

A wave containing only a single frequency (monochromatic) is perfectly correlated with itself at all time delays, in accordance with the above relation. Conversely, a wave whose phase drifts quickly will have a short coherence time.

Similarly, pulses (wave packets) of waves, which naturally have a broad range of frequencies, also have a short coherence time since the amplitude of the wave changes quickly.

Finally, white light, which has a very broad range of frequencies, is a wave which varies quickly in both amplitude and phase. Since it consequently has a very short coherence time (just 10 periods or so), it is often called incoherent.

Monochromatic sources are usually lasers; such high monochromaticity implies long coherence lengths (up to hundreds of meters). For example, a stabilized and monomode helium-neon laser can easily produce light with coherence lengths of 300 m. [

Not all lasers are monochromatic, however (e.g. for a mode-locked Ti-sapphire laser, $\Delta\lambda \approx$2 nm-70 nm). LEDs are characterized by $\Delta\lambda \approx$50 nm, and tungsten filament lights exhibit $\Delta\lambda \approx$600 nm, so these sources have shorter coherence times than the most monochromatic lasers. Holography requires light with a long coherence time.

In contrast, optical coherence tomography, in its classical version, uses light with a short coherence time.

In optics, temporal coherence is measured in an interferometer such as the Michelson interferometer or Mach-Zehnder interferometer. In these devices, a wave is combined with a copy of itself that is delayed by time $\tau$. A detector measures the time-averaged intensity of the light exiting the interferometer. The resulting interference visibility gives the temporal coherence at delay $\tau$. Since for most natural light sources, the coherence time is much shorter than the time resolution of any detector, the detector itself does the time averaging.

Spatial Coherence

The coherent terahertz magnon laser system utilizing the spatial coherence comprises at least two coherent terahertz magnon lasers generating two terahertz coherent laser beams that are received by a THz received that combines such two beams to obtain the holographic image.

In some systems, such as water waves or optics, wave-like states can extend over one or two dimensions. Spatial coherence describes the ability for two points in space, $x_1$ and $x_2$, in the extent of a wave to interfere, when averaged over time. More precisely, the spatial coherence is the cross-correlation between two points in a wave for all times. If a wave has only 1 value of amplitude over an infinite length, it is perfectly spatially coherent. The range of separation between the two points over which there is significant interference defines the diameter of the coherence area, A, (Coherence length, often a feature of a source, is usually an industrial term related to the coherence time of the source, not the coherence area in the medium.) $A_c$ is the relevant type of coherence for the Young's double-slit interferometer. It is also used in optical imaging systems and particularly in various types of astronomy telescopes. Sometimes people also use "spatial coherence" to refer to the visibility when a wave-like state is combined with a spatially shifted copy of itself.

Consider a tungsten light-bulb filament. Different points in the filament emit light independently and have no fixed phase-relationship. In detail, at any point in time the profile of the emitted light is going to be distorted. The profile will change randomly over the coherence time. Since for a white-light source such as a light-bulb is small, the filament is considered a spatially incoherent source. In contrast, a radio antenna array, has large spatial coherence because antennas at opposite ends of the array emit with a fixed phase-relationship. Light waves produced by a laser often have high temporal and spatial coherence (though the degree of coherence depends strongly on the exact properties of the laser). Spatial coherence of laser beams also manifests itself as speckle patterns and diffraction fringes seen at the edges of shadow.

Holography requires temporally and spatially coherent light. Its inventor, Dennis Gabor, produced successful holograms more than ten years before lasers were invented. To produce coherent light he passed the monochromatic light from an emission line of a mercury-vapor lamp through a pinhole spatial filter Holography Coherent superpositions of optical wave fields include holography. Holographic objects are used frequently in daily life in bank notes and credit cards.

Non-Optical Wave Fields

Further applications concern the coherent superposition of non-optical wave fields. In quantum mechanics for example one considers a probability field, which is related to the wave function (interpretation: density of the probability amplitude). Here the applications concern, among others, the future technologies of quantum computing and the already available technology of quantum cryptography.

Quantum cryptography is the science of exploiting quantum mechanical properties to perform cryptographic tasks. The best known example of quantum cryptography is quantum key distribution which offers an information-theoretically secure solution to the key exchange problem. The advantage of quantum cryptography lies in the fact that it allows the completion of various cryptographic tasks that are proven or conjectured to be impossible using only classical (i.e. non-quantum) bated object.

In an embodiment of the present technology the THz hologram image of an object can be recorded on a THz multilayer material Example IX A layered tungsten disulfide Crystal can be used for recording a THz hologram image. Please, see "Terahertz surface emission ofd-band electrons from a layered tungsten disulfide crystal by the surface field", Longhui Zhang, Yuanyuan Huang, Qiyi Zhao, Lipeng Zhu, Zehan Yao, Yixuan Zhou, Wanyi Du, and Xinlong Xu; Phys. Rev. B 96, 155202—Published 6 Oct. 2017.

The above discussion has set forth the operation of various exemplary systems and devices, as well as various embodiments pertaining to exemplary methods of operating such systems and devices. In various embodiments, one or more steps of a method of implementation (calculating the optimum voltage bias, for example) are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for generation of coherent terahertz radiation comprising:
   one or more multilayer tunable microcolumns, each said multilayer tunable microcolumns further comprising:
   a substrate;
   a bottom electrode;
   a bottom layer of a ferromagnetic material further comprising a magnon gain medium (MGM) coupled to the bottom electrode;
   a tunnel junction coupled to the ferromagnetic material;
   a spin injector coupled to the tunnel junction;
   a pinning layer coupled to the spin injector;
   a reference layer coupled to the pinning layer; and
   a top electrode;
   and
   a containment cavity enclosing at least one said multilayer tunable microcolumns;
   wherein said MGM is configured to host non-equilibrium magnons generated by non-equilibrium electrons with spin down injected into said MGM from said spin injector via said tunnel junction.

2. The apparatus of claim 1, wherein the containment cavity includes a first hole configured to output said coherent terahertz radiation.

3. The apparatus of claim 2, further comprising: a storage cavity enclosing the containment cavity.

4. The apparatus of claim 3, wherein the storage cavity is of a larger dimension than the corresponding dimension of the containment cavity.

5. The apparatus of claim 3, wherein said storage cavity includes a second hole configured to output coherent terahertz radiation.

6. The apparatus of claim 1, wherein a bias voltage is applied across at least one said multilayer tunable microcolumn between said top electrode and said bottom electrode, and whereas the bias voltage is configured to shift the Fermi level of the spin injector relative to the Fermi level of the ferromagnetic material.

7. The apparatus of claim 6, wherein the ferromagnetic material further comprises a conduction band split into two sub bands including a first sub band with spin up and a second sub band with spin down separated by an exchange energy gap, and wherein said first sub band includes electrons with spin up polarized in the direction of magnetization of the ferromagnetic material, and wherein said second sub band includes electrons with spin down polarized in the direction opposite to said direction of magnetization of the ferromagnetic material.

8. The apparatus of claim 1, wherein said MGM is configured to use the non-equilibrium magnons to generate a terahertz radiation.

9. The apparatus of claim 1, wherein said substrate is made from a material selected from the group of materials consisting of aluminum oxide ($Al_2O_3$); indium-tin-oxide (InTnO); silicon (Si); silicone on sapphire (SoS); and magnesium oxide (MgO).

10. The apparatus of claim 1, wherein said bottom electrode is made from a material selected from the group of materials consisting of cobalt iron alloy ($Co_{0.5}Fe_{0.5}$); silver (Ag); gold (Au); platinum (Pt); cobalt (Co); palladium (Pd); titanium (Ti); and titanium tungsten (TiW).

11. The apparatus of claim 1, wherein MGM is made from a material selected from the group consisting of chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$; and Heusler alloy $Co_2FeAl_{0.5}Si_{0.5}$ (CFAS).

12. The apparatus of claim 1, wherein said tunnel junction is made from a material selected from the group of materials consisting of magnesium oxide (MgO); aluminum oxide ($Al_2O_3$); and spinel $MgAl_2O_4$.

13. A method for tuning the frequency of terahertz radiation; wherein a coherent terahertz magnon laser comprises: one or more multilayer tunable microcolumns, each said multilayer tunable microcolumn further comprising: a substrate; a bottom electrode; a bottom layer of a ferromagnetic material further comprising a magnon gain medium (MGM) coupled to the bottom electrode; a tunnel junction coupled to the ferromagnetic material; a spin injector coupled to the tunnel junction; a pinning layer coupled to the spin injector; a reference layer coupled to the pinning layer; and a top electrode; and a containment cavity enclosing at least one said multilayer tunable microcolumns, said method comprising:
   applying a bias voltage across said at least one multilayer tunable microcolumn, to shift a Fermi level of said spin injector with respect to a Fermi level of said MGM to initiate generation of non-equilibrium magnons; wherein an interaction between said non-equilibrium magnons causes generation of terahertz radiation;
   tuning the frequency of said generated coherent terahertz radiation by varying said bias voltage;
   and
   using said containment cavity to output tunable coherent terahertz radiation.

14. The method of claim 13, further comprising:
the step of modulating said tunable coherent terahertz radiation by modulating said bias voltage with modulating frequency.

15. A method for tuning the frequency of terahertz radiation by using a coherent terahertz magnon laser, wherein said coherent terahertz magnon laser comprises: one or more multilayer tunable microcolumns, each said multilayer tunable microcolumn further comprising: a substrate; a bottom electrode; a bottom layer of a ferromagnetic material further comprising a magnon gain medium (MGM) coupled to the bottom electrode; a tunnel junction coupled to the ferromagnetic material; a spin injector coupled to the tunnel junction; a pinning layer coupled to the spin injector; a reference layer coupled to the pinning layer; and a top electrode; and a containment cavity enclosing at least one said multilayer tunable microcolumns, and wherein said containment cavity is enclosed into a storage cavity; comprising:

applying a bias voltage across said at least one multilayer tunable microcolumns, to shift a Fermi level of said spin injector with respect to a Fermi level of said MGM to initiate generation of non-equilibrium magnons; wherein an interaction between said non-equilibrium magnons causes generation of terahertz radiation;

tuning the frequency of said generated coherent terahertz radiation by varying said bias voltage;

using said containment cavity to output tunable coherent terahertz radiation into said storage cavity; and using said storage cavity to output tunable coherent terahertz radiation.

16. The method of claim 15, further comprising:
the step of modulating said tunable coherent terahertz radiation by modulating said bias voltage with modulating frequency.

17. The method of claim 15, further comprising:
the step of modulating said tunable coherent terahertz radiation by modulating said output coherent radiation by external means.

18. The method of claim 15, further comprising:
the step of modulating said tunable coherent terahertz radiation by modulating said output coherent radiation by using piezo materials to mechanically change the size of an output hole.

19. The method of claim 15, further comprising:
the step of modulating said tunable coherent terahertz radiation by modulating said output coherent radiation using synthetic ceramics materials.

20. A coherent terahertz communication system comprising: one or more multilayer tunable microcolumns, each said multilayer tunable microcolumn further comprising: a substrate; a bottom electrode; a bottom layer of a ferromagnetic material further comprising a magnon gain medium (MGM) coupled to the bottom electrode; a tunnel junction coupled to the ferromagnetic material; a spin injector coupled to the tunnel junction; a pinning layer coupled to the spin injector; a reference layer coupled to the pinning layer; and a top electrode; and a containment cavity enclosing at least one said multilayer tunable microcolumns at least one coherent terahertz magnon laser; each said coherent terahertz magnon laser configured to generate a coherent terahertz laser beam;

and a terahertz coherent detection system configured to receive at least one said coherent terahertz laser beam and configured to combine each said received coherent terahertz laser beam into a combined terahertz beam; said combined terahertz beam selected from the group consisting of: a 3D terahertz image; a terahertz image; a terahertz spatial coherent image; a terahertz temporal coherent image; a terahertz spatial and temporal coherent image; a terahertz hologram image; and a quantum cryptographic image.

21. The apparatus of claim 20, further comprising: a storage cavity enclosing the containment cavity.

22. The coherent terahertz communication system of claim 21, wherein the storage cavity is of a larger dimension than the corresponding dimension of the containment cavity.

23. The coherent terahertz communication system of claim 21, wherein said storage cavity includes a second hole configured to output coherent terahertz radiation.

24. The coherent terahertz communication system of claim 20, wherein the containment cavity includes a first hole configured to output said coherent terahertz radiation.

25. A method of coherent terahertz communication employing at least one coherent terahertz magnon laser and a THz coherent detection system, wherein said coherent terahertz magnon laser comprises: one or more multilayer tunable microcolumns, each said multilayer tunable microcolumn further comprising: a substrate; a bottom electrode; a bottom layer of a ferromagnetic material further comprising a magnon gain medium (MGM) coupled to the bottom electrode; a tunnel junction coupled to the ferromagnetic material; a spin injector coupled to the tunnel junction; a pinning layer coupled to the spin injector; a reference layer coupled to the pinning layer; and a top electrode; and a containment cavity enclosing at least one said multilayer tunable microcolumns, said method comprising:

generating a coherent THz illuminating beam; said coherent THz illuminating beam illuminating an object;

generating a coherent THz reference beam;

receiving said coherent THz illuminating beam illuminating said object;

receiving said coherent THz reference beam;

combining said two received THz coherent beams to form a holographic image of said object;

illuminating said holographic image of said object by a THz reading beam configured to read said holographic image of said object; and displaying said holographic image of said object on a computer-readable display.

26. The method of claim 25, wherein said step of generating said coherent THz laser beam further includes the step of:

tuning the frequency of said coherent terahertz magnon laser to enable propagation of said coherent THz laser beam via a propagation window of the atmosphere.

27. The method of claim 25, wherein said step of displaying said holographic image of said object on a computer-readable display further includes the step of:

recording said THz holographic image on a THz multilayer material.

* * * * *